United States Patent
Sada et al.

(10) Patent No.: US 12,543,737 B2
(45) Date of Patent: *Feb. 10, 2026

(54) HERBICIDAL COMPOSITION AND METHOD FOR CONTROLLING WEEDS

(71) Applicant: SUMITOMO CHEMICAL COMPANY, LIMITED, Chuo-ku (JP)

(72) Inventors: Yoshinao Sada, Kasai (JP); Yoshinobu Jin, Kasai (JP)

(73) Assignee: SUMITOMO CHEMICAL COMPANY, LIMITED, Chuo-ku (JP)

(*) Notice: Subject to any disclaimer, the term of this patent is extended or adjusted under 35 U.S.C. 154(b) by 643 days.

This patent is subject to a terminal disclaimer.

(21) Appl. No.: 17/905,073

(22) PCT Filed: Mar. 3, 2021

(86) PCT No.: PCT/JP2021/008087
§ 371 (c)(1),
(2) Date: Aug. 26, 2022

(87) PCT Pub. No.: WO2021/182212
PCT Pub. Date: Sep. 16, 2021

(65) Prior Publication Data
US 2023/0143563 A1    May 11, 2023

(30) Foreign Application Priority Data

Mar. 10, 2020 (JP) ................. 2020-040576
Jul. 21, 2020 (JP) ................. 2020-124198

(51) Int. Cl.
| | | |
|---|---|---|
| A01N 43/84 | (2006.01) | |
| A01N 43/54 | (2006.01) | |
| A01N 57/20 | (2006.01) | |
| A01P 13/00 | (2006.01) | |
| A01P 13/02 | (2006.01) | |

(52) U.S. Cl.
CPC ............ *A01N 43/84* (2013.01); *A01N 43/54* (2013.01); *A01N 57/20* (2013.01); *A01P 13/00* (2021.08); *A01P 13/02* (2021.08)

(58) Field of Classification Search
CPC ........ A01N 43/84; A01N 43/54; A01N 57/20; A01P 13/00; A01P 13/02
See application file for complete search history.

(56) References Cited

U.S. PATENT DOCUMENTS

| | | |
|---|---|---|
| 4,640,707 A | 2/1987 | Nagano et al. |
| 5,173,103 A | 12/1992 | Yoshida et al. |
| 5,698,492 A | 12/1997 | Sakaki et al. |
| 6,451,740 B2 | 9/2002 | Tohyama et al. |
| 6,537,948 B1 | 3/2003 | Tohyama et al. |
| 7,105,470 B1 | 9/2006 | Hacker et al. |
| 10,555,528 B1 | 2/2020 | Sada |

| | | |
|---|---|---|
| 2009/0233796 A1 | 9/2009 | North |
| 2018/0007901 A1 | 1/2018 | Massa et al. |
| 2022/0061326 A1 | 3/2022 | Sada et al. |

FOREIGN PATENT DOCUMENTS

| | | |
|---|---|---|
| WO | WO 2006/061562 A1 | 6/2006 |
| WO | WO 2010/145992 A1 | 12/2010 |
| WO | WO 2017/202768 A1 | 11/2017 |
| WO | WO 2019/030098 A1 | 2/2019 |
| WO | WO 2019/030104 A1 | 2/2019 |
| WO | WO 2019/101533 A1 | 5/2019 |

(Continued)

OTHER PUBLICATIONS

Takano, H. et al., Glufosinate enhances the activity of protoporphyrinogen oxidase inhibitor, 2020, Weed Science, vol. 68, pp. 324-332. (Year: 2020).*

Beyers, J., et al., Weed Management Programs in Glufosinate-Resistant Soybean (Glycine Max), 2002, Weed Technology, vol. 16, pp. 267-273. (Year: 2002).*

International Search Report issued on Apr. 20, 2021 in PCT/JP2021/008087 (with English translation), 7 pages.

(Continued)

*Primary Examiner* — Ali Soroush
*Assistant Examiner* — Andriae M Holt
(74) *Attorney, Agent, or Firm* — Oblon, McClelland, Maier & Neustadt, L.L.P.

(57) ABSTRACT

Provided are a herbicidal composition having excellent control effect on weeds and a method for controlling weeds. The herbicidal composition comprising one or more PPO-inhibiting herbicides selected from the group consisting of flumioxazin, flumiclorac-pentyl, lactofen, carfentrazone-ethyl, sulfentrazone, tiafenacil, trifludimoxazin, and a compound represented by the following formula (I):

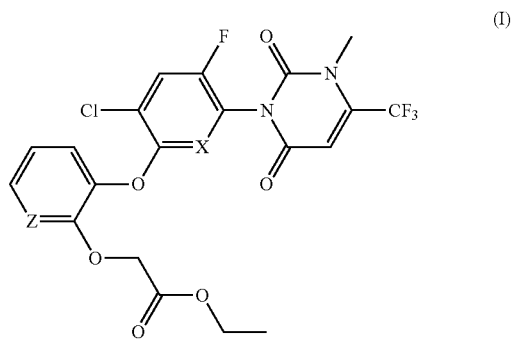

wherein X represents CH or a nitrogen atom, and Z represents CH or a nitrogen atom, and glufosinate or a salt thereof, wherein a weight ratio of the PPO-inhibiting herbicide to the glufosinate or a salt thereof is 1:150 to 1:700.

3 Claims, No Drawings

(56) References Cited

FOREIGN PATENT DOCUMENTS

WO  WO 2019/106568 A1  6/2019
WO  WO 2020/137868 A1  7/2020

OTHER PUBLICATIONS

International Preliminary Report on Patentability and Written Opinion issued on Sep. 6, 2022 in PCT/JP2021/008087 (with English translation), 10 pages.
Price et al., "Efficacy of Residual and Non-Residual Herbicides Used in Cotton Production Systems When Applied with Glyphosate, Glufosinate, or MSMA", Weed Technology, 2008, vol. 22, pp. 459-466.

* cited by examiner

HERBICIDAL COMPOSITION AND METHOD FOR CONTROLLING WEEDS

CROSS-REFERENCE TO RELATED APPLICATIONS

The present application is a 35 U.S.C. § 371 national stage patent application of International patent application PCT/JP2021/008087, filed on Mar. 3, 2021, which is based on and claims the benefits of priority to Japanese Application No. 2020-040576, filed on Mar. 10, 2020, and Japanese Application No. 2020-124198, filed on Jul. 21, 2020. The entire contents of all of the above applications are incorporated herein by reference.

TECHNICAL FIELD

The present invention relates to a herbicidal composition and a method for controlling weeds.

BACKGROUND ART

At present, many herbicides are commercially available and used. Many PPO-inhibiting herbicides have been used for the purpose of controlling weeds (see, for example, Patent Documents 1 to 6). Glufosinate has been known as an active ingredient of herbicides. It has been known that a herbicidal composition comprising a PPO-inhibiting herbicide and glufosinate as active ingredients acts synergistically at certain ratios (see, for example, Patent Documents 7 to 11) and works to reduce phytotoxicity at different ratios (see, for example, Patent Document 12). However, it has never been known that remarkably excellent synergistic effect is exerted when a weight ratio of a specific PPO-inhibiting herbicide to glufosinate is within a range of 1/700 to 1/150.

CITATION LIST

Patent Document

Patent Document 1: WO 2017/202768
Patent Document 2: WO 2019/101533
Patent Document 3: WO 2019/106568
Patent Document 4: U.S. Pat. No. 4,640,707
Patent Document 5: U.S. Pat. No. 6,537,948
Patent Document 6: WO 2010/145992
Patent Document 7: U.S. Pat. No. 5,173,103
Patent Document 8: U.S. Pat. No. 5,698,492
Patent Document 9: US 2018/0007901
Patent Document 10: WO 2019/030098
Patent Document 11: WO 2006/061562
Patent Document 12: U.S. Pat. No. 10,555,528

SUMMARY OF THE INVENTION

Problems to be Solved by Invention

An object of the present invention is to provide a herbicidal composition having excellent control effect on weeds and a method for controlling weeds.

Means to Solve Problems

The present inventors have found that excellent control effect on weeds is exerted by using a specific PPO-inhibiting herbicide in combination with glufosinate or a salt thereof at a specific ratio.

The present invention includes the following aspects.

[1] A herbicidal composition comprising one or more PPO-inhibiting herbicides selected from the group consisting of flumioxazin, flumiclorac-pentyl, lactofen, carfentrazone-ethyl, sulfentrazone, tiafenacil, trifludimoxazin, and a compound represented by the following formula (I):

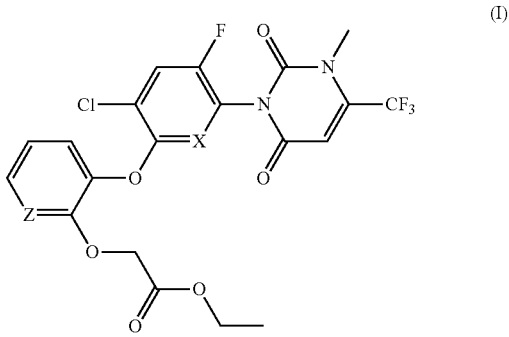

wherein X represents CH or a nitrogen atom, and Z represents CH or a nitrogen atom, and glufosinate or a salt thereof, wherein a weight ratio of the PPO-inhibiting herbicide to the glufosinate or a salt thereof is 1:150 to 1:700.

[2] The herbicidal composition according to [1], wherein the PPO-inhibiting herbicide is flumioxazin.

[3] The herbicidal composition according to [1], wherein the PPO-inhibiting herbicide is a compound represented by formula (I) and, in the formula (I), X is CH, and Z is a nitrogen atom.

[4] A method for controlling weeds, comprising a step of simultaneously or sequentially in any order applying one or more PPO-inhibiting herbicides selected from the group consisting of flumioxazin, flumiclorac-pentyl, lactofen, carfentrazone-ethyl, sulfentrazone, tiafenacil, trifludimoxazin, and a compound represented by the following formula (I):

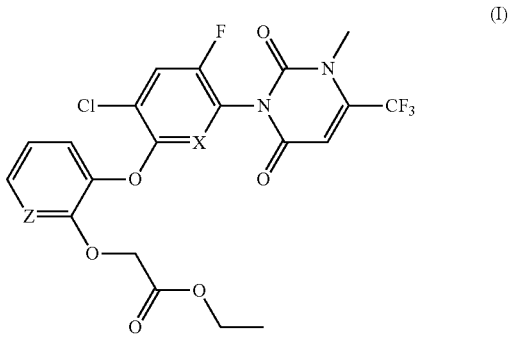

wherein X represents CH or a nitrogen atom, and Z represents CH or a nitrogen atom, and glufosinate or a salt thereof, wherein a weight ratio of the PPO-inhibiting herbicide to the glufosinate or a salt thereof is 1:150 to 1:700.

[5] The method for controlling weeds according to [4], wherein the PPO-inhibiting herbicide is flumioxazin.

[6] The method for controlling weeds according to [4], wherein the PPO-inhibiting herbicide is a compound represented by formula (I) and, in the formula (I), X is CH, and Z is a nitrogen atom.

[7] The method for controlling weeds according to [4], wherein the weeds to be controlled are waterhemp (*Amaranthus tuberculatus*=*Amaranthus rudis*=*Amaranthus tamariscinus*) having a substitution of an amino acid residue of G210Δ in PPX2.

Effects of Invention

According to the present invention, it becomes possible to control weeds with high effect.

MODE FOR CARRYING OUT THE INVENTION

The herbicidal composition of the present invention (hereinafter referred to as the present composition) comprises one or more PPO-inhibiting herbicides selected from the group consisting of flumioxazin, flumiclorac-pentyl, lactofen, carfentrazone-ethyl, sulfentrazone, tiafenacil, trifludimoxazin, and a compound represented by formula (I), and glufosinate or a salt thereof.

The method for controlling weeds of the present invention (hereinafter referred to as the present method) comprises a step of applying one or more PPO-inhibiting herbicides selected from the group consisting of flumioxazin, flumiclorac-pentyl, lactofen, carfentrazone-ethyl, sulfentrazone, tiafenacil, trifludimoxazin, and a compound represented by formula (I), and glufosinate or a salt thereof. The PPO-inhibiting herbicide and glufosinate or a salt thereof may be either simultaneously or sequentially applied, and the order is not limited in the case of sequential application.

The PPO-inhibiting herbicide in the present specification (hereinafter sometimes referred to as the present PPO) includes those known as one crystal form or crystal polymorphism (WO 2018178039), any crystal form and a mixture (mixed crystal) thereof are included in the present PPO. Of the present PPO, the compound represented by formula (I) is a compound represented by the following formula (I-1):

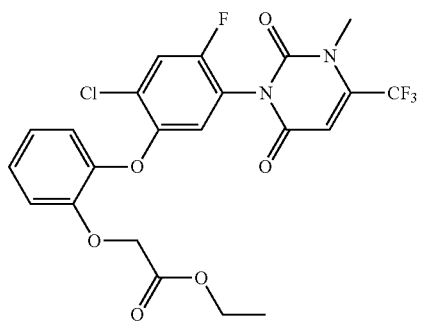

(hereinafter referred to as compound W), a compound represented by the following formula (I-2):

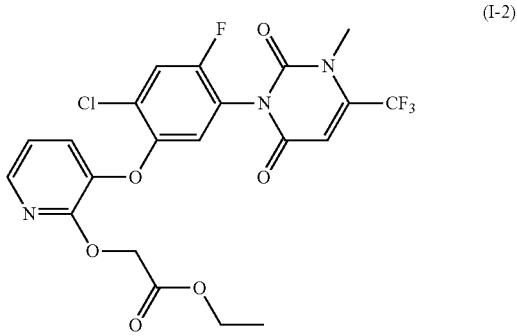 [SMILES: CCOC(=O)COc1ncccc1Oc1cc(-n2c(=O)cc(C(F)(F)F)n(C)c2=O)c(F)cc1Cl]

(hereinafter referred to as compound X), a compound represented by the following formula (I-3):

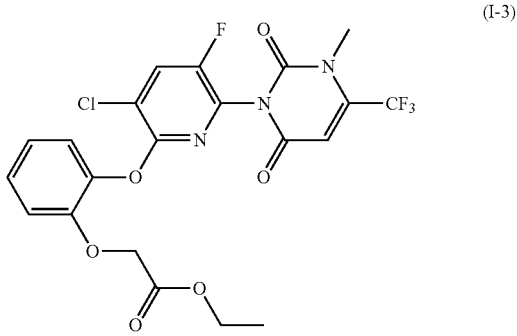 [SMILES: CCOC(=O)COc1ccccc1Oc1nc(-n2c(=O)cc(C(F)(F)F)n(C)c2=O)c(F)cc1Cl]

(hereinafter referred to as compound Y), or a compound represented by the following formula (I-4):

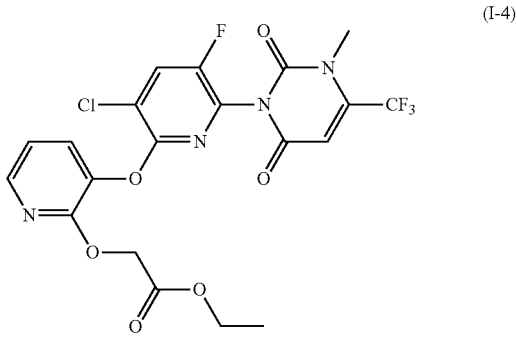 [SMILES: CCOC(=O)COc1ncccc1Oc1nc(-n2c(=O)cc(C(F)(F)F)n(C)c2=O)c(F)cc1Cl]

(hereinafter referred to as compound Z). Common name of the compound X is epyrifenacil.

All of the compound W, the compound X, the compound Y and the compound Z are known compound, and the compound W can be produced by the method mentioned in U.S. Pat. No. 6,451,740, the compound X can be produced by the method mentioned in U.S. Pat. No. 6,537,948, and the compound Y and the compound Z can be produced by the method mentioned in WO 2017/202768.

Glufosinate or a salt thereof in the present specification includes glufosinate of an acid form, a D type or L type optical isomer thereof (L-glufosinate which is L type is also called glufosinate-P), a mixture of two optical isomers at any ratio (including a racemic form which is a 50:50 mixture, and when simply called glufosinate, it usually means racemic), and agronomically acceptable salts with respect to all of those mentioned above. Examples of the cation that forms an acid include, but are not limited to, alkali metal ions (lithium, potassium, etc.), alkali earth metal ions (calcium, etc.), ammonium ions, various amine ions and various phosphonium ions. Specific examples thereof include glufosinate, glufosinate-P, glufosinate-ammonium, glufosinate-P-ammonium, glufosinate-sodium, glufosinate-P-sodium, glufosinate-biproamine, glufosinate-P-biproamine, glufosinate-tetrabutylamine, glufosinate-P-tetrabutylamine, glufosinate-choline, glufosinate-P-choline, glufosinate-isopropylamine, glufosinate-P-isopropylamine, glufosinate-potassium, glufosinate-P-potassium, glufosinate-diglycolamine, glufosinate-P-diglycolamine, glufosinate-dimethylamine, glufosinate-P-dimethylamine, glufosinate-monoethanolamine, glufosinate-P-monoethanolamine, glufosinate-trimethyltetradecylamine, glufosinate-P-trimethyltetradecylamine, glufosinate-diethylamine, glufosinate-P-diethylamine, glufosinate-diolamine, glufosinate-P-diolamine, glufosinate-dodecylamine, glufosinate-P-dodecylamine, glufosinate-triethylamine, glufosinate-P-triethylamine, glufosinate-tris(2-hydroxypropyl)amine, glufosinate-P-tris(2-hydroxypropyl)amine, glufosinate-trolamine, glufosinate-P-trolamine, glufosinate-lithium, glufosinate-P-lithium, glufosinate-tetrabutylphosphonium, glufosinate-P-tetrabutylphosphonium and the like. Hereinafter, these acid forms and salts are sometimes collectively called the present glufosinate.

According to the present method, the present PPO and the present glufosinate are applied to the place where weeds are growing or will grow in a crop field, a vegetable field, an orchard or a non-crop area. In the crop field, they are applied before, simultaneously with and/or after seeding crop seeds.

The present composition is usually a formulation prepared by mixing the present PPO and the present glufosinate with a carrier such as a solid carrier and a liquid carrier, and adding adjuvants for formulation such as surfactant as necessary. The formulation type is preferably a soluble liquid, a suspension concentrate, an oil dispersion, a wettable powder, a water dispersible granule, a granule and an emulsifiable concentrate. It may also be possible to use the present composition in combination with a formulation comprising other herbicides as active ingredients. It may also be possible to use the present composition as an active ingredient in combination with a formulation comprising one or more compounds, the compound being neither the present PPO nor the present glufosinate, as an active ingredient. The formulation may be a formulation comprising the present PPO, the present glufosinate, and different herbicides. It may also be possible to use a formulation comprising the present PPO, the present glufosinate, and different herbicides in combination with a formulation comprising, as an active ingredient, herbicides different from the above active ingredients.

The total content of the present PPO and the present glufosinate in the present composition is usually within a range of 0.01 to 90% by weight, preferably 1 to 80% by weight, and more preferably 15 to 25% by weight.

The present composition is used for controlling weeds. The method for applying the present composition include, for example, a method for spraying the present composition on the soil of a cultivation field (soil application) and a method for spraying the present composition to emerged weeds (foliar application). Spraying the present composition is usually performed by spraying a spray liquid obtained by mixing the present composition with water, using a spraying machine. The spray volume is not particularly limited and is usually 50 to 1,000 L/ha, preferably 100 to 500 L/ha, and more preferably 140 to 300 L/ha. Foliar application may be uniformly performed on the whole area, and the application may be precision farming-like variable rate application (VRA).

In the present composition and the present method, examples of other herbicides that may be used in combination with the present PPO and the present glufosinate include the following compounds. The number in parentheses indicates CAS RN (registered trademark).

2,3,6-TBA (2,3,6-trichlorobenzoic acid), 2,3,6-TBA-dimethylammonium, 2,3,6-TBA lithium salt, 2,3,6-TBA potassium salt, 2,3,6-TBA sodium salt, 2,4-D, 2,4-D choline salt, 2,4-D-biproamine, 2,4-D-doboxyl, 2,4-D-2-ethylhexyl, 2,4-D-3-butoxypropyl, 2,4-D-ammonium, 2,4-D-butotyl, 2,4-D-butyl, 2,4-D-diethylammonium, 2,4-D-dimethylammonium, 2,4-D-diolamine salt, 2,4-D-dodecylammonium, 2,4-D-ethyl, 2,4-D-heptylammonium, 2,4-D-isobutyl, 2,4-D-isooctyl, 2,4-D-isopropyl, 2,4-D-isopropylammonium, 2,4-D-lithium salt, 2,4-D-meptyl, 2,4-D-methyl, 2,4-D-octyl, 2,4-D-pentyl, 2,4-D-propyl, 2,4-D-sodium salt, 2,4-D-tefuryl, 2,4-D-tetradecylammonium, 2,4-D-triethylammonium, 2,4-D-tris(2-hydroxypropyl)ammonium, 2,4-D-trolamine salt, 2,4-DB, 2,4-DB choline salt, 2,4-DB-biproamine, 2,4-DB-butyl, 2,4-DB-dimethylammonium, 2,4-DB-isoctyl, 2,4-DB-potassium salt, 2,4-DB-sodium salt, acetochlor, acifluorfen, acifluorfen-sodium salt, aclonifen, ACN (2-amino-3-chloronaphthalene-1,4-dione), alachlor, allidochlor, alloxydim, ametryn, amicarbazone, amidosulfuron, aminocyclopyrachlor, aminocyclopyrachlor-methyl, aminocyclopyrachlor-potassium, aminopyralid, aminopyralid choline salt, aminopyralid-potassium salt, aminopyralid-tripromine, amiprophos-methyl, amitrole, anilofos, asulam, atrazine, azafenidin, azimsulfuron, beflubutamid, benazolin-ethyl, bencarbazone, benfluralin, benfuresate, bensulfuron, bensulfuron-methyl, bensulide, bentazon, benthiocarb, benzfendizone, benzobicyclon, benzofenap, benzthiazuron, bialafos-bialaphos, bicyclopyrone, bifenox, bispyribac, bispyribac-sodium salt, bixlozone, bromacil, bromobutide, bromofenoxim, bromoxynil, bromoxynil-octanoate, butachlor, butafenacil, butamifos, butralin, butroxydim, butylate, cafenstrole, carbetamide, chlomethoxyfen, chloramben, chloridazon, chlorimuron, chlorimuron-ethyl, chlorobromuron, chlorotoluron, chloroxuron, chlorpropham, chlorsulfuron, chlorthal-dimethyl, chlorthiamid, cinidon, cinidon-ethyl, cinmethylin, cinosulfuron, clethodim, clodinafop, clodinafop-propargyl, clomazone, clomeprop, clopyralid, clopyralid choline salt, clopyralid-methyl, clopyralid-olamine salt, clopyralid-potassium salt, clopyralid-tris (2-hydroxypropyl)ammonium, cloransulam, cloransulam-methyl, cumyluron, cyanazine, cyclopyranil, cycloate, cyclopyrimorate, cyclosulfamuron, cycloxydim, cyhalofop, cyhalofop-butyl, daimuron, dalapon, dazomet, desmedipham, desmetryn, di-allate, dicamba, dicamba choline salt, dicamba-biproamine, dicamba-trolamine salt, dicamba-diglycolamine salt, dicamba-dimethylammonium, dicamba-diolamine salt, dicamba-isopropylammonium, dicamba-methyl, dicamba-olamine salt, dicamba-potassium salt, dicamba-sodium salt, dichlobenil, dichlorprop, dichlorprop choline salt, dichlorprop-biproamine, dichlorprop-etexyl, dichlorprop-butotyl, dichlorprop-dimethylammonium, dichlorprop-ethylammonium, dichlorprop-isoctyl, dichlorprop-methyl, dichlorprop-P, dichlorprop-P choline salt, dichlorprop-P-biproamine, dichlorprop-P-etexyl, dichlorprop-P-dimethylammonium, dichlorprop-potassium salt, dichlorprop-sodium, diclofop, diclofop-methyl, diclosulam, difenoxuron, difenzoquat, difenzoquat metilsulfate, diflufenican, diflufenzopyr, diflufenzopyr-sodium salt, dimefuron, dimepiperate, dimethachlor, dimethametryn, dimethenamid, dimethenamid-P, dimepiperate, dinitramine, dinoseb, dinoterb, diphenamid, diquat, diquat-dibromide, DSMA (disodium methylarsonate), dithiopyr, diuron, DNOC (2-methyl-4,6-dinitrophenol, esprocarb, ethalfluralin, ethametsulfuron, ethametsulfuron-methyl, ethidimuron, ethofumesate, ethoxyfen-ethyl, ethoxysulfuron, etobenzanid, fenoxaprop, fenoxaprop-ethyl, fenoxaprop-P, fenoxaprop-P-ethyl, fenoxasulfone, fenquinotrione, fentrazamide, fenuron, flamprop-M, flazasulfuron, florasulam, florpyrauxifen, florpyrauxifen-benzyl, fluazifop, fluazifop-butyl, fluazifop-P, fluazifop-P-butyl, fluazolate, flucarbazone, flucarbazone-sodium salt, flucetosulfuron, flufenacet, flufenpyr, flufenpyr-ethyl, flumetsulam, flumetsulam, fluometuron, fluoroglycofen-ethyl, flupoxam, flupropanate, flupyrsulfuron, flupyrsulfuron-methyl-sodium, flurenol, fluridone, flurochloridone, fluroxypyr, fluroxypyr-butometyl, fluroxypyr-meptyl, flurtamone, fluthiacet, fluthiacet-methyl, fomesafen, fomesafen-sodium, foramsulfuron, fosamine, glyphosate, glyphosate choline salt, glyphosate-isopropylammonium, glyphosate-biproamine, glyphosate-ammonium salt, glyphosate-diammonium salt, glyphosate-potassium salt, glyphosate-sodium salt, glyphosate-trimesium, halauxifen, halauxifen-methyl, halosafen, halosulfuron, halosulfuron-methyl, haloxyfop, haloxyfop-etotyl, haloxyfop-methyl, haloxyfop-P, haloxyfop-P-etotyl, haloxyfop-P-methyl, hexazinone, imazamethabenz, imazamethabenz-methyl, imazamox, imazamox-ammonium salt, imazapic, imazapic-ammonium salt, imazapyr, imazapyr-isopropylammonium salt, imazaquin, imazaquin-ammonium salt, imazethapyr, imazethapyr-ammonium salt, imazosulfuron, indanofan, indaziflam, iodosulfuron, iodosulfuron-methyl-sodium, iofensulfuron, iofensulfuron-sodium, ioxynil, ioxynil-octanoate, ipfencarbazone, isoproturon, isouron, isoxaben, isoxachlortole, isoxaflutole, lenacil, linuron, maleic hydrazide, MCPA (2-(4-chloro-2-methylphenoxy)acetic acid), MCPA choline salt, MCPA-biproamine, MCPA-etexyl, MCPA-butotyl, MCPA-butyl, MCPA-dimethylammonium, MCPA-diolamine salt, MCPA-ethyl, MCPA-isobutyl, MCPA-isoctyl, MCPA-isopropyl, MCPA-methyl, MCPA-olamine salt, MCPA-sodium salt, MCPA-trolamine salt, MCPB (4-(4-chloro-2-methylphenoxy)butanoic acid), MCPB choline salt, MCPB-biproamine, MCPB-ethyl, MCPB-methyl, MCPB-sodium salt, mecoprop, mecoprop choline salt, mecoprop-biproamine, mecoprop-2-ethylhexyl, mecoprop-dimethylammonium, mecoprop-diolamine salt, mecoprop-ethadyl, mecoprop-isoctyl, mecoprop-methyl, mecoprop-potassium salt, mecoprop-sodium salt, mecoprop-trolamine salt, mecoprop-P, mecoprop-P choline salt, mecoprop-P-2-ethylhexyl, mecoprop-P-dimethylammonium, mecoprop-P-isobutyl, mecoprop-P-potassium, mefenacet, mesosulfuron, mesosulfuron-methyl, mesotrione, metam, metamifop, metamitron, metazachlor, metazosulfuron, methabenzthiazuron, methiozolin, methyldymron, metobromuron, metolachlor, metosulam, metoxuron, metribuzin, metsulfuron, metsulfuron-methyl, molinate, monolinuron, naproanilide, napropamide, napropamide-M, naptalam, neburon, nicosulfuron, norflurazon, oleic acid, orbencarb, orthosulfamuron, oryzalin, oxadiargyl, oxadiazon, oxasulfuron, oxaziclomefone, oxyfluorfen, paraquat, paraquat-dichloride, pebulate, pelargonic acid, pendimethalin, penoxsulam, pentanochlor, pentoxazone, pethoxamid, phenisopham, phenmedipham, picloram, picolinafen, pinoxaden, piperophos, pretilachlor, primisulfuron, primisulfuron-methyl, prodiamine, profluazol, profoxydim, prometon, prometryn, propachlor, propanil, propaquizafop, propazine, propham, propisochlor, propoxycarbazone, propoxycarbazone-sodium salt, propyrisulfuron, propyzamide, prosulfocarb, prosulfuron, pyraclonil, pyraflufen-ethyl, pyrasulfotole, pyrazolynate, pyrazosulfuron, pyrazosulfuron-ethyl, pyrazoxyfen, pyribenzoxim, pyributicarb, pyridafol, pyridate, pyriftalid, pyriminobac, pyriminobac-methyl, pyrimisulfan, pyrithiobac, pyrithiobac-sodium, pyroxasulfone, pyroxsulam, quinclorac, quinmerac, quizalofop, quizalofop-ethyl, quizalofop-tefuryl, quizalofop-P, quizalofop-P-ethyl, quizalofop-P-tefuryl, rimsulfuron, saflufenacil, sethoxydim, EPIC (S-ethyl N,N-dipropylcarbamothioate), siduron, simazine, simetryn, S-metolachlor, MSMA (sodium hydrogen methylarsonate), sulcotrione, sulfometuron, sulfometuron-methyl, sulfosulfuron, swep, TCA (2,2,2-trichloroacetic acid), TCA-ammonium, TCA-calcium, TCA-ethadyl, TCA-magnesium, TCA-sodium, tebutam, tebuthiuron, tefuryltrione, tembotrione, tepraloxydim, terbacil, terbumeton, terbuthylazine, terbutryn, tetflupyrolimet, thaxtomin A, thenylchlor, thiazopyr, thidiazimin, thiencarbazone, thiencarbazone-methyl, thifensulfuron, thifensulfuron-methyl, tiocarbazil, tolpyralate, topramezone, tralkoxydim, triafamone, tri-allate, triasulfuron, triaziflam, tribenuron, tribenuron-methyl, triclopyr, triclopyr-butotyl, triclopyr-ethyl, triclopyr-triethylammonium, tridiphane, trietazine, trifloxysulfuron, trifloxysulfuron-sodium, trifluralin, triflusulfuron, triflusulfuron-methyl, tritosulfuron, vernolate, 4-(4-fluorophenyl)-6-[(2-hydroxy-6-oxo-1-cyclohexen-1-yl) carbonyl]-2-methyl-1,2,4-triazine-3,5(2H,4H)-dione, 2-chloro-N-(1-methyl-1H-tetrazol-5-yl)-3-(methylthio)-4-(trifluoromethyl)benzamide, 2-methyl-N-(5-methyl-1,3,4-oxadiazol-2-yl)-3-(methanesulfonyl) (trifluoromethyl)benzamide, 4-amino-3-chloro-5-fluoro-6-(7-fluoro-1H-indol-6-yl)pyridine-2-carboxylic acid.

Examples of the herbicides, which may be particularly preferably used in combination in the present method and the present composition, include glyphosate-potassium salt, glyphosate-monoethanolamine, 2,4-D choline, 2,4-D 2-ethylhexyl, dicamba-biproamine, dicamba-diglycolamine, dicamba-tetrabutylamine, imazethapyr-ammonium, saflufenacil and pyroxasulfone.

After this paragraph, when the glufosinate compound is a salt (e.g., glufosinate-P-sodium), its weight means an acid equivalence (in this example, an equivalence of glufosinate-P acid form).

In the present composition, the mixing ratio by weight of the present PPO to the present glufosinate is within a range of 1:150 to 1:700.

In the present method, the weight ratio of an application rate of the present PPO to that of the present glufosinate is within a range of 1:150 to 1:700.

Examples of more preferable mixing ratio by weight of the present PPO to the present glufosinate in the present composition include about 1:170, 1:200, 1:250, 1:300, 1:400, 1:500 and 1:600.

Examples of more preferable weight ratio of an application rate of the present PPO to that of the present glufosinate in the present method include about 1:170, 1:200, 1:250, 1:300, 1:400, 1:500 and 1:600.

"About" as used herein includes a range of a ratio increased or decreased by 10% by weight compared with a specified ratio. For example, about 1:200 includes a range of 1:180 to 1:220.

Examples of particularly preferable combination of the present PPO and the present glufosinate and a range of the weight ratio in the present composition and the present method are mentioned below, but are not limited thereto.

Combination of flumioxazin and glufosinate-ammonium (1:150, 1:170, 1:200, 1:250, 1:300, 1:400, 1:500, 1:600, 1:800)

Combination of flumioxazin and glufosinate-P-ammonium (1:150, 1:170, 1:200, 1:250, 1:300, 1:400, 1:500, 1:600, 1:800)

Combination of flumioxazin and glufosinate-sodium (1:150, 1:170, 1:200, 1:250, 1:300, 1:400, 1:500, 1:600, 1:800)

Combination of flumioxazin and glufosinate-P-sodium (1:150, 1:170, 1:200, 1:250, 1:300, 1:400, 1:500, 1:600, 1:800)

Combination of flumiclorac-pentyl and glufosinate-ammonium (1:150, 1:170, 1:200, 1:250, 1:300, 1:400, 1:500, 1:600, 1:800)

Combination of flumiclorac-pentyl and glufosinate-P-ammonium (1:150, 1:170, 1:200, 1:250, 1:300, 1:400, 1:500, 1:600, 1:800)

Combination of flumiclorac-pentyl and glufosinate-sodium (1:150, 1:170, 1:200, 1:250, 1:300, 1:400, 1:500, 1:600, 1:800)

Combination of flumiclorac-pentyl and glufosinate-P-sodium (1:150, 1:170, 1:200, 1:250, 1:300, 1:400, 1:500, 1:600, 1:800)

Combination of lactofen and glufosinate-ammonium (1:150, 1:170, 1:200, 1:250, 1:300, 1:400, 1:500, 1:600, 1:800)

Combination of lactofen and glufosinate-P-ammonium (1:150, 1:170, 1:200, 1:250, 1:300, 1:400, 1:500, 1:600, 1:800)

Combination of lactofen and glufosinate-sodium (1:150, 1:170, 1:200, 1:250, 1:300, 1:400, 1:500, 1:600, 1:800)

Combination of lactofen and glufosinate-P-sodium (1:150, 1:170, 1:200, 1:250, 1:300, 1:400, 1:500, 1:600, 1:800)

Combination of carfentrazone-ethyl and glufosinate-ammonium (1:150, 1:170, 1:200, 1:250, 1:300, 1:400, 1:500, 1:600, 1:800)

Combination of carfentrazone-ethyl and glufosinate-P-ammonium (1:150, 1:170, 1:200, 1:250, 1:300, 1:400, 1:500, 1:600, 1:800)

Combination of carfentrazone-ethyl and glufosinate-sodium (1:150, 1:170, 1:200, 1:250, 1:300, 1:400, 1:500, 1:600, 1:800)

Combination of carfentrazone-ethyl and glufosinate-P-sodium (1:150, 1:170, 1:200, 1:250, 1:300, 1:400, 1:500, 1:600, 1:800)

Combination of sulfentrazone and glufosinate-ammonium (1:150, 1:170, 1:200, 1:250, 1:300, 1:400, 1:500, 1:600, 1:800)

Combination of sulfentrazone and glufosinate-P-ammonium (1:150, 1:170, 1:200, 1:250, 1:300, 1:400, 1:500, 1:600, 1:800)

Combination of sulfentrazone and glufosinate-sodium (1:150, 1:170, 1:200, 1:250, 1:300, 1:400, 1:500, 1:600, 1:800)

Combination of sulfentrazone and glufosinate-P-sodium (1:150, 1:170, 1:200, 1:250, 1:300, 1:400, 1:500, 1:600, 1:800)

Combination of tiafenacil and glufosinate-ammonium (1:150, 1:170, 1:200, 1:250, 1:300, 1:400, 1:500, 1:600, 1:800)

Combination of tiafenacil and glufosinate-P-ammonium (1:150, 1:170, 1:200, 1:250, 1:300, 1:400, 1:500, 1:600, 1:800)

Combination of tiafenacil and glufosinate-sodium (1:150, 1:170, 1:200, 1:250, 1:300, 1:400, 1:500, 1:600, 1:800)

Combination of tiafenacil and glufosinate-P-sodium (1:150, 1:170, 1:200, 1:250, 1:300, 1:400, 1:500, 1:600, 1:800)

Combination of trifludimoxazin and glufosinate-ammonium (1:150, 1:170, 1:200, 1:250, 1:300, 1:400, 1:500, 1:600, 1:800)

Combination of trifludimoxazin and glufosinate-P-ammonium (1:150, 1:170, 1:200, 1:250, 1:300, 1:400, 1:500, 1:600, 1:800)

Combination of trifludimoxazin and glufosinate-sodium (1:150, 1:170, 1:200, 1:250, 1:300, 1:400, 1:500, 1:600, 1:800)

Combination of trifludimoxazin and glufosinate-P-sodium (1:150, 1:170, 1:200, 1:250, 1:300, 1:400, 1:500, 1:600, 1:800)

Combination of the compound W and glufosinate-ammonium (1:150, 1:170, 1:200, 1:250, 1:300, 1:400, 1:500, 1:600, 1:800)

Combination of the compound W and glufosinate-P-ammonium (1:150, 1:170, 1:200, 1:250, 1:300, 1:400, 1:500, 1:600, 1:800)

Combination of the compound W and glufosinate-sodium (1:150, 1:170, 1:200, 1:250, 1:300, 1:400, 1:500, 1:600, 1:800)

Combination of the compound W and glufosinate-P-sodium (1:150, 1:170, 1:200, 1:250, 1:300, 1:400, 1:500, 1:600, 1:800)

Combination of the compound X and glufosinate-ammonium (1:150, 1:170, 1:200, 1:250, 1:300, 1:400, 1:500, 1:600, 1:800)

Combination of the compound X and glufosinate-P-ammonium (1:150, 1:170, 1:200, 1:250, 1:300, 1:400, 1:500, 1:600, 1:800)

Combination of the compound X and glufosinate-sodium (1:150, 1:170, 1:200, 1:250, 1:300, 1:400, 1:500, 1:600, 1:800)

Combination of the compound X and glufosinate-P-sodium (1:150, 1:170, 1:200, 1:250, 1:300, 1:400, 1:500, 1:600, 1:800)

Combination of the compound Y and glufosinate-ammonium (1:150, 1:170, 1:200, 1:250, 1:300, 1:400, 1:500, 1:600, 1:800)

Combination of the compound Y and glufosinate-P-ammonium (1:150, 1:170, 1:200, 1:250, 1:300, 1:400, 1:500, 1:600, 1:800)

Combination of the compound Y and glufosinate-sodium (1:150, 1:170, 1:200, 1:250, 1:300, 1:400, 1:500, 1:600, 1:800)

Combination of the compound Y and glufosinate-P-sodium (1:150, 1:170, 1:200, 1:250, 1:300, 1:400, 1:500, 1:600, 1:800)

Combination of the compound Z and glufosinate-ammonium (1:150, 1:170, 1:200, 1:250, 1:300, 1:400, 1:500, 1:600, 1:800)

Combination of the compound Z and glufosinate-P-ammonium (1:150, 1:170, 1:200, 1:250, 1:300, 1:400, 1:500, 1:600, 1:800)

Combination of the compound Z and glufosinate-sodium (1:150, 1:170, 1:200, 1:250, 1:300, 1:400, 1:500, 1:600, 1:800)

Combination of the compound Z and glufosinate-P-sodium (1:150, 1:170, 1:200, 1:250, 1:300, 1:400, 1:500, 1:600, 1:800)

The present composition can exert a synergistic herbicidal effect on a broad range of weeds compared to the effect that is expected from the effects obtained when each one of the present PPO and the present glufosinate is applied alone. Further, the present composition can efficiently control a broad range of weeds in a crop field and a vegetable field, each where a normal tilled or non-tilled cropping is performed, an orchard and a non-crop area.

The present method can exert a synergistic herbicidal effect on a broad range of weeds compared to the effect that is expected from the effects obtained when each one of the present PPO and the present glufosinate is applied alone. Further, the present composition can efficiently control a broad range of weeds in a crop field and a vegetable field, each where a normal tilled or non-tilled cropping is performed, an orchard and a non-crop area.

The present composition, or the present PPO and the present glufosinate may be applied to the agricultural field where crop seeds were seeded or will be seeded before, simultaneously with and/or after seeding the crop seeds treated with one or more compounds selected from the group consisting of insecticide compounds, nematicide compounds and fungicide compounds and the like.

The present composition may be used in combination with other agrochemical active compounds. The insecticide compounds, the nematicide compounds and the fungicide compounds used in combination with the present composition include neonicotinoid-based compounds, diamide-based compounds, carbamate-based compounds, organophosphorus-based compounds, biological nematicide compounds, other insecticide compounds and nematicide compounds, as well as azole-based compounds, strobilurin-based compounds, metalaxyl-based compounds, SDHI compounds, and other fungicide compounds and plant growth regulators.

The crop field in the present invention may include a food crop field such as a peanut field, a soybean field, a corn field and a wheat field, a feed crop field such as a sorghum field and an oat field, an industrial crop field such as a cotton field and a rapeseed field, and a sugar crop field such as a sugarcane field and a sugar beet field. The vegetable field in the present invention may include a field for cultivating solanaceae vegetables (eggplant, tomato, green pepper, chili pepper, potato, etc.), a field for cultivating cucurbitaceae vegetables (cucumber, pumpkin, zucchini, watermelon, melon, etc.), a field for cultivating cruciferous vegetables (radish, turnip, horseradish, kohlrabi, Chinese cabbage, cabbage, mustard, broccoli, cauliflower, etc.), a field for cultivating asteraceae vegetables (burdock, crown daisy, artichoke, lettuce, etc.), a field for cultivating liliaceae vegetables (welsh onion, onion, garlic, asparagus, etc.), a field for cultivating umbelliferae vegetables (carrot, parsley, celery, parsnip, etc.), a field for cultivating chenopodiaceae vegetables (spinach, chard, etc.), a field for cultivating lamiaceae vegetables (perilla, mint, basil, lavender, etc.), a strawberry field, a sweet potato field, a yam field, and a taro field, etc.

The land under perennial crops in the present invention may include an orchard, a tea field, a mulberry field, a coffee field, a banana field, a palm field, a flowering tree farm, a flowering tree field, a planting stock field, a nursery field, a forest land, or a garden. The orchard tree in the present invention may include pome fruits (apple, pear, Japanese pear, Chinese quince, quince, etc.), stone fruits (peach, plum, nectarine, Japanese apricot, cherry, apricot, prune, etc.), citrus fruits (citrus unshiu, orange, lemon, lime, grapefruit, etc.), nut trees (chestnut, walnut, hazelnut, almond, pistachio, cashew nut, macadamia nut, etc.), berry fruits (grape, blueberry, cranberry, blackberry, raspberry, etc.), persimmon, olive, loquat, etc.

The non-crop area in the present invention may include an athletic field, an empty lot, a railroad edge, a park, a parking area, a road edge, a dry riverbed, under power lines, a building land, a factory site, etc.

The crops cultivated in a crop field (hereinafter referred to as the present crop) in the present invention is not limited as long as their varieties are varieties which are usually cultivated as crops.

Examples of the present crop include the following crops.

Agricultural crops; corn (dent corn, flint corn, flour corn, popcorn, waxy corn, sweet corn, field corn), rice (long grain, short grain, mid grain, japonica, tropical japonica, indica, javanica, paddy rice, upland rice, floating rice, direct sowing, transplanting, waxy rice), wheat (bread wheat (soft wheat, hard wheat, medium wheat, red wheat, white wheat), durum wheat, spelt wheat, club wheat, and, winter habit and spring habit thereof), barley (two-rowed barley (=beer barley), six-rowed barley, hulless barley, waxy barley and, winter habit and spring habit thereof), rye (winter habit, spring habit), triticale (winter habit and spring habit), oat (winter habit, spring habit), sorghum, cotton (upland cotton, pima cotton), soybean (non-succulent dry bean varieties, edamame varieties, forage varieties, and indeterminate type, determinate type and semideterminate type thereof), groundnut (peanut), common bean (kidney bean), lima bean, adzuki bean, cowpea, mung bean, black gram, runner bean, rice bean, moth bean, tepary bean, fava bean, pea, chickpea, lentil, lupin, pigeon pea, alfalfa, buckwheat, sugar beet (sugar, feed, root, leaf, and fuel), rape, canola (winter habit, spring habit), sunflower (for oil extraction, edible, ornamental use), sugarcane, tobacco, tee plant, mulberry and the like.

Horticultural crops (vegetables): solanaceae vegetables (eggplant, tomato, green pepper, chili pepper, potato, etc.), cucurbitaceae vegetables (cucumber, pumpkin, zucchini, watermelon, melon, squash, etc.), cruciferous vegetables (radish, turnip, horseradish, kohlrabi, Chinese cabbage, cabbage, mustard, broccoli, cauliflower, etc.), asteraceae vegetables (burdock, crown daisy, artichoke, lettuce, etc.), liliaceae vegetables (welsh onion, onion, garlic, asparagus, etc.), umbelliferae vegetables (carrot, parsley, celery, parsnip, etc.), chenopodiaceae vegetables (spinach, chard, etc.), lamiaceae vegetables (perilla, mint, basil, lavender, etc.), strawberry, sweet potato field, yam and aroid.

Horticultural crops (fruit trees): pome fruits (apple, pear, Japanese pear, Chinese white pear, Chinese quince, quince, etc.), stone fruits (peach, plum, nectarine, Japanese apricot, yellow peach, apricot, prune, etc.), citrus fruits (citrus unshiu, orange, lemon, lime, grapefruit, etc.), nut trees (chestnut, walnut, hazelnut, almond, pistachio, cashew nut, macadamia nut, etc.), berry fruits (blueberry, cranberry, blackberry, raspberry, etc.), grape, persimmon, olive, loquat, banana, coffee, date palm, coconut palm and the like.

Horticultural crops (ornamental): flowering trees, roadside trees (ash, birch, dogwood, eucalyptus, ginkgo, lilac, maple, oak, poplar, Chinese redbud, formosan gum, plane tree, zelkova, Japanese thuja, Japanese fir, southern Japanese hemlock, temple juniper, pine, spruce, yew), ornamental flowers, ornamental plants, and lawn grasses.

The crops mentioned above are not particularly limited as long as their varieties are varieties which are usually cultivated.

The present crop mentioned above may be a plant which can be produced by natural hybridization, a plant which can occur as the result of a mutation, an F1 hybrid plant, or a transgenic plant (also referred to as a "genetically-modified plant"). These plants generally have properties such as a property that the tolerance to a herbicide is imparted, a property that a toxic substance against pests is accumulated (also referred to as "pest resistance"), a property that the sensitivity to a plant disease is suppressed (also referred to as "plant disease resistance"), a property that yield potential is increased, a property that the resistance to a biological or non-biological stress factor is improved, and a property that the quality of a product is modified (e.g., increase or decrease in the content of a specific component, change in composition, improvement in a storage property or processability).

The term "F1 hybrid plant" refers to a plant of a first filial generation which is produced by hybridizing two different varieties with each other, and is generally a plant which has a more superior trait to that of either one of parents thereof, i.e., has a hybrid vigor property. The term "transgenic plant" refers to a plant which is produced by introducing a foreign gene from another organism such as a microorganism into a plant and which is imparted with a property that cannot be acquired easily by hybridization breeding, induction of a mutation or a naturally occurring recombination under a natural environment.

Examples of the technique for producing the above-mentioned plants include a conventional breeding technique, a transgenic technique, a genome-based breeding technique, a new breeding technique, and a genome editing technique. The conventional breeding technique is a technique for producing a plant having a desirable property by mutation or hybridization. The transgenic technique is a technique for imparting a new property to a specific organism (e.g., a microorganism) by isolating a gene (DNA) of interest from the organism and then introducing the gene (DNA) into the genome of another target organism, or an antisense technique or an RNA interference technique which is a technique for imparting a new or improved property to a plant by silencing another gene occurring in the plant. The genome-based breeding technique is a technique for increasing the efficiency of breeding using genomic information, and includes a DNA marker (also referred to as "genome marker" or "gene marker") breeding technique and genomic selection. For example, the DNA marker breeding is a method in which an offspring having a desired useful trait gene is selected from many hybrid offsprings using a DNA marker that is a DNA sequence capable of serving as an indicator of the position of a specific useful trait gene on a genome. The analysis of a hybrid offspring of a plant at a seedling stage thereof using the DNA marker has such a characteristic that it becomes possible to shorten the time required for breeding effectively.

The genomic selection is such a technique that a prediction equation is produced from a phenotype and genomic information both obtained in advance and then a property is predicted from the prediction equation and the genomic information without carrying out the evaluation of the phenotype. The genomic selection can contribute to the increase in efficiency of breeding. A "new breeding technique" is a collective term for combinations of breeding techniques including molecular biological techniques. Examples of the new breeding technique include techniques such as cisgenesis/intragenesis, oligonucleotide-directed mutagenesis, RNA-dependent DNA methylation, genome editing, grafting to a GM rootstock or scion, reverse breeding, agroinfiltration, and seed production technology (SPT). A genome editing technique is a technique for converting genetic information in a sequence-specific manner, and can perform the deletion of a base sequence, the substitution of an amino acid sequence, the introduction of a foreign gene, and the like. Examples of the tool for the technique include zinc-finger nucleases (ZFN, ZFNs), TALEN, CRISPR/Cas9, CRISPER/Cpf1 and meganuclease which can cleave DNA in a sequence-specific manner, and also include a sequence-specific genome modification technique using CAS9 nickase, Target-AID and the like which is produced by any one of the modifications of the above-mentioned tools.

Examples of the above-mentioned plants include plants listed in genetically modified crops registration database (GM APPROVAL DATABASE) in an electric information site in INTERNATIONAL SERVICE for the ACQUISITION of AGRI-BIOTECH APPLICATIONS, ISAAA) (http://www.isaaa.org/). More specific examples of the plans include a herbicide-tolerant plant, a pest-resistant plant, a plant disease-resistant plant, a plant of which the quality of a product is modified (e.g., the increase or decrease in content of a component, the change in composition, improvement in a storage property or processability), a fertility trait modified plant, a non-biological stress-tolerant plant or a plant of which a trait associated with growth or yield is modified.

Examples of the plant imparted with tolerance to herbicides are mentioned below.

Examples of the mechanism of the tolerance to a herbicide include reduction of the affinity of the herbicide for a target; rapid metabolism (e.g., decomposition, modification) of the herbicide as the result of the expression of an enzyme capable of inactivating the herbicide; inhibition of the intake of the herbicide into the plant body; and inhibition of the migration of the herbicide in the plant body.

Examples of the plant imparted with tolerance to a herbicide by a transgenic technique includes plants each imparted with the tolerance to: a protoporphyrinogen oxidase (abbreviated as "PPO", hereinafter) herbicide such as flumioxazin; a 4-hydroxyphenylpyruvate dioxygenase (abbreviated as "HPPD", hereinafter) inhibitor such as isoxaflutole and mesotrione; an acetolactate synthase (abbreviated as "ALS", hereinafter) inhibitor such as an imidazolinone-type herbicide such as imazethapyr and a sulfonylurea-type herbicide such as thifensulfuron-methyl; a 5-enolpyruvylshikimate 3-phosphate synthase (abbreviated as "EPSPS", hereinafter) inhibitor such as glyphosate; a glutamine synthetase inhibitor such as glufosinate; an auxin-type herbicide such as 2,4-D and dicamba; and an oxynil-type herbicide such as bromoxynil. Preferred examples of the herbicide-tolerant transgenic plant include: winter cereals such as wheat, barley, rye and oat; canola, sorghum, soybean, corn, cotton, rice, rapeseed, sugar beet, sugar cane, grape, lentil, sunflower, alfalfa, a pome fruit, a stone fruit, coffee, tea, strawberry, lawn grass, and a vegetable such as tomato, potato, cucumber and lettuce; more preferably winter cereals such as wheat, barley, rye and oat, soybean, corn, cotton, rice, grape, tomato, potato, and a pome fruit.

Hereinbelow, specific examples of the herbicide-tolerant plant will be mentioned.

Plants tolerant to glyphosate herbicides: produced by introducing at least any one of a glyphosate-tolerant EPSPS gene originated from *Agrobacterium tumefaciens* strain CP4 (CP4 epsps), a glyphosate N-acetyltransferase gene obtained by modifying a glyphosate N-acetyltransferase gene originated from *Bacillus licheniformis* (gat4601 or gat4621), a glyphosate oxidase gene originated from *Ochrobacterum*

*anthropi* strain LBAA (goxv247) or an EPSP gene originated from corn (*Zea mays*) and having a glyphosate tolerance mutation (mepsps or 2mepsps). Examples of the major plant include alfalfa (*Medicago sativa*), *Argentina* canola (*Brassica napus*), cotton (*Gossypium hirsutum* L.), creeping bentgrass (*Agrostis stolonifera*), corn (*Zea mays* L.), polish canola (*Brassica rapa*), potato (*Solanum tuberosum* L.), soybean (*Glycine max* L.), sugar beet (*Beta vulgaris*) and wheat (*Triticum aestivum*). Some of the glyphosate-tolerant plants are commercially available. For example, a genetically-modified plant into which CP4 epsps is introduced is commercially available by trade names including the trademark of "Roundup Ready (registered trademark)"; a genetically-modified plant into which gat4601 or gat4621 is introduced is commercially available by the trade names of "Optimum GAT (trademark)", "Optimum (registered trademark) Gly canola" and the like; and a genetically-modified plant into which mepsps or 2mepsps is introduced is commercially available by the trade name of "GlyTol (trademark)". More specific commercially available glyphosate-tolerant plants include, for example, corn by the trade names of "Roundup Ready (trademark) Maize", "Roundup Ready (trademark) 2 Maize", "Agrisure (trademark) GT", "Agrisure (trademark) GT/CB/LL", "Agrisure (trademark) GT/RW", "Agrisure (trademark) 3000GT", "YieldGard (trademark) VT (trademark) Rootworm (trademark) RR2" and "YieldGard (trademark) VT Triple"; soybean by the trade names of "Roundup Ready (trademark) Soybean" and "Optimum GAT (trademark)"; cotton by the trade names of "Roundup Ready (trademark) Cotton", "Roundup Ready (trademark) Flex Cotton" and "GlyTol (trademark)"; canola by the trade names of "Roundup Ready (trademark) Canola" and "Optimum (registered trademark) Gly canola"; alfalfa by the trade name of "Roundup Ready (trademark) Alfalfa"; rice by the trade name of "Roundup Ready Rice"; sugar cane by the trade names of "Roundup Ready (trademark) sugar beet" and "InVigor (trademark) sugar beet"; and wheat (*Triticum aestivum*) by the trade name of "Roundup Ready (trademark) wheat".

Plants tolerant to glufosinate herbicides: produced by introducing at least any one of a gene (bar) for phosphinothricin N-acetyltransferase (hereinafter abbreviated as PAT) originated from *Streptomyces hygroscopicus*, a gene (pat) originated from *Streptomyces viridochromogenes* and a synthetic PAT gene (pat syn) originated from *Streptomyces viridochromogenes* strain Tu494. Examples of the major plant include *Argentina* canola (*Brassica napus*), chicory (*Cichorium intybus*), cotton (*Gossypium hirsutum* L.), corn (*Zea mays* L.), polish canola (*Brassica rapa*), rice (*Oryza sativa* L.), soybean (*Glycine max* L.) and sugar beet (*Beta vulgaris*). Some of the glufosinate-tolerant plants are commercially available. For example, a genetically-modified plant into which bar or pat is introduced is commercially available by the trade names of "LibertyLink (trademark)", "InVigor (trademark)" and "WideStrike (trademark)". More specific commercially available glufosinate-tolerant plants include, for example, corn by the trade names of "Roundup Ready (trademark) 2", "Liberty Link (trademark)", "Herculex (trademark) I", "Herculex RW", "Herculex XTRA (trademark)", "Agrisure (trademark) GT/CB/LL", "Agrisure (trademark) CB/LL/RW" and "Bt10"; cotton by the trade name of "FiberMax (trademark) Liberty Link (trademark)"; rice by the trade name of "Liberty Link (trademark) Rice"; canola by the trade name of "inVigor (trademark) Canola"; soybean by the trade name of "Liberty Link (trademark) Soybean"; and sugar cane by the trade name of "Liberty Link (trademark) sugarbeet".

Plants tolerant to oxynil-type herbicides (e.g., bromoxynil): produced by introducing a nitrilase gene (bxn) originated from *Klebsiella pneumoniae* subsp. *Ozaenae*. Examples of the major plant include *Argentina* canola (*Brassica napus*), cotton (*Gossypium hirsutum* L.) and tobacco (*Nicotiana tabacum* L.). Some plants tolerant to oxynil-type herbicides are commercially available. For example, these plants are commercially available by trade names including "Navigator (trademark)" and "BXN (trademark)". More specific commercially available plants tolerant to oxynil-type herbicides include, for example, cotton by the trade name of "BXN (trademark) Cotton"; and *Argentina* canola by the trade name of "Navigator (trademark) Cotton".

Plants tolerant to ALS herbicides: carnation (*Dianthus caryophyllus*) having, introduced therein, an ALS herbicide-tolerant ALS gene (surB) originated from tobacco (*Nicotiana tabacum*) as a selection marker is commercially available by the trade names of, for example, "Moondust (trademark)", "Moonshadow (trademark)", "Moonshade (trademark)", "Moonlite (trademark)", "Moonaqua (trademark)", Moonvista (trademark)", "Moonique (trademark)", "Moonpearl (trademark)", "Moonberry (trademark)" and "Moonvelvet (trademark)". Lineseed (*Linum usitatissumum* L.) having, introduced therein, an ALS herbicide-tolerant ALS gene (als) originated from mouse-ear cress (*Arabidopsis thaliana*) is commercially available by the trade name of, for example, "CDC Triffid Flax". Corn (*Zea mays* L.) having tolerance to a sulfonylurea-type herbicide and an imidazolinone-type herbicide and having, introduced therein, an ALS herbicide-tolerant ALS gene (zm-hra) originated from corn is commercially available by the trade name of, for example, "Optimum (trademark) GAT (trademark)". Soybean having tolerance to an imidazolinone-type herbicide and having, introduced therein, an ALS herbicide-tolerant ALS gene (csr1-2) originated from mouse-ear cress is commercially available by the trade name of, for example, "Cultivance". Soybean having, introduced therein, an ALS herbicide-tolerant ALS gene (gm-hra) originated from soybean (*Glycine max*) is commercially available by the trade names of, for example, "Treus (trademark)", "Plenish (trademark)" and "Optimum GAT (trademark)". Cotton having, introduced therein, an ALS herbicide-tolerant ALS gene (S4-HrA) originated from tobacco (*Nicotiana tabacum* cv. *Xanthi*) can also be mentioned.

Plants tolerant to HPPD herbicides: produced by introducing an HPPD gene (avhppd-03) originated from oat (*Avena sativa*). For example, soybean into which a PAT gene (pat) originated from *Streptomyces viridochromogenes* is also introduced simultaneously with the above-mentioned gene is commercially available by the trade name of "Herbicide-tolerant Soybean line" as soybean having tolerance to mesotrione and glufosinate.

Plants tolerant to 2,4-D or ACCase herbicides: corn having, introduced therein, an aryloxyalkanoate dioxygenase gene (aad-1) originated from *Sphingobium herbicidovorans* and having tolerance to 2,4-D or an ACCase herbicide is commercially available by the trade name of "Enlist (trademark) Maize". Soybean and cotton having, introduced therein, an aryloxyalkanoate dioxygenase gene (aad-12) originated from *Delftia acidovorans* and having tolerance to 2,4-D or an ACCase herbicide are known, and are commercially available by the trade name of, for example, "Enlist (trademark) Soybean".

Plants tolerant to dicamba herbicides: produced by introducing a dicamba monooxygenase gene (dmo) originated from *Stenotrophomonas maltophilia* strain DI-6. Soybean and cotton into which the above-mentioned gene is introduced are known. Soybean (*Glycine max* L.) into which a glyphosate-tolerant EPSPS gene (CP4 epsps) originated from *Agrobacterium tumefaciens* strain CP4 is also introduced simultaneously with the above-mentioned gene is commercially available by the trade name of, for example, "tenuity (registered trademark) Roundup Ready (trademark) 2 Xtend (trademark)".

Other plants which are modified with respect to the tolerance to herbicides are also widely known, such as: alfalfa, apple, barley, eucalyptus, lineseed, grape, lentil, rapeseed, pea, potato, rice, sugar beet, sunflower, tobacco, tomato, turf grass and wheat each having tolerance to glyphosate (see, for example, U.S. Pat. Nos. 5,188,642, 4,940,835, 5,633,435, 5,804,425 and 5,627,061); bean, cotton, soybean, pea, potato, sunflower, tomato, tobacco, corn, sorghum and sugar cane each having tolerance to dicamba (see, for example, WO 2008/051633, U.S. Pat. Nos. 7,105, 724 and 5,670,454); soybean, sugar beet, potato, tomato and tobacco each having tolerance to glufosinate (see, for example, U.S. Pat. Nos. 6,376,754, 5,646,024 and 5,561, 236); cotton, peppers, apple, tomato, sunflower, tobacco, potato, corn, cucumber, wheat, soybean, sorghum and millets each having tolerance to 2,4-D (see, for example, U.S. Pat. Nos. 6,153,401, 6,100,446, WO 2005/107437, U.S. Pat. Nos. 5,608,147 and 5,670,454); canola, corn, barnyard millet, barley, cotton, brown mustard, lettuce, lentil, melon, foxtail millet, oat, rapeseed, potato, rice, rye, sorghum, soybean, sugar beet, sunflower, tobacco, tomato and wheat each having tolerance to an ALS-inhibiting herbicide (e.g., a sulfonylurea-type herbicide or an imidazolinone-type herbicide) (see, for example, U.S. Pat. No. 5,013,659, WO 2006/060634, U.S. Pat. Nos. 4,761,373, 5,304,732, 6,211, 438, 6,211,439 and 6,222,100), and particularly, rice having tolerance to an imidazolinone-type herbicide is known, and examples thereof include rice having a specific mutation (e.g., S653N, S654K, A122T, S653(At)N, S654(At)K, A122 (At)T) in an acetolactate synthase gene (acetohydroxyacid synthase gene) (see, for example, US 2003/0217381, WO 2005/20673)); barley, sugar cane, rice, corn, tobacco, soybean, cotton, rapeseed, sugar beet, wheat and potato each having tolerance to an HPPD-inhibiting herbicide (e.g., an isoxazole-type herbicide such as isoxaflutole; a triketone-type herbicide such as sulcotrione and mesotrione; a pyrazole-type herbicide such as pyrazolynate) or diketonitrile that is a decomposition product of isoxaflutole (see, for example, WO 2004/055191, WO 1996/38567, WO 1997/049816 and U.S. Pat. No. 6,791,014); and wheat, soybean, cotton, sugar beet, rapeseed, rice, corn, sorghum, sugar cane and sugar beet each having tolerance to a PPO-inhibiting herbicide (see, for example, US 2002/0073443, US 2008/0052798, Pest Management Science, 61, 2005, 277-285).

Examples of a plant that is imparted with tolerance to a herbicide by a conventional breeding technique or genome-based breeding technique include: rice "Clearfield (registered trademark) Rice", wheat "Clearfield (registered trademark) Wheat", sunflower "Clearfield (registered trademark) Sunflower", lentil "Clearfield (registered trademark) lentils" and canola "Clearfield (registered trademark) canola" (a product by manufactured by BASF) each having tolerance to an imidazolinone-type ALS-inhibition-type herbicide such as imazethapyr and imazamox; soybean "STS soybean" having tolerance to a sulfonylurea-type ALS-inhibition-type herbicide such as thifensulfuron-methyl; corn "SR corn" (also known as "Poast Protected (registered trademark) corn") having tolerance to an acetyl CoA carboxylase inhibitor such as a trione oxime-type herbicide and an aryloxyphenoxypropionate-type herbicide; sunflower "ExpressSun (registered trademark)" having tolerance to a sulfonylurea-type herbicide such as tribenuron; rice "Provisia (trademark) Rice" having tolerance to an acetyl CoA carboxylase inhibitor such as quizalofop; canola "Triazine Tolerant Canola" having tolerance to a photosystem II inhibitor; and sorghum "Igrowth (trademark)" having tolerance to an imidazolinone-type herbicide.

An example of a plant that is imparted with tolerance to a herbicide by a genome editing technique is canola "SU Canola (registered trademark)" having tolerance to a sulfonylurea-type herbicide and produced by Rapid Trait Development System (RTDS (registered trademark)). RTDS (registered trademark) corresponds to an oligonucleotide-directed mutagenesis employed in a genome editing technique, and is a technique whereby it becomes possible to introduce a mutation into a plant through Gene Repair Oligonucleotide (GRON), i.e., a DNA-RNA chimeric oligonucleotide, without needing to cleave DNA in the plant. Other examples of the plant also include: corn which is reduced in herbicide tolerance and a phytic acid content as the result of the deletion of endogenous gene IPK1 using a zinc finger nuclease (see, for example, Nature 459, 437-441 2009); and rice which is imparted with herbicide tolerance using CRISPR/Cas9 (see, for example, Rice, 7, 5 2014).

Examples of a plant imparted with tolerance to a herbicide by a new breeding technique include soybean in which a trait of a GM rootstock is imparted to a scion using the breeding technique employing grafting. Specifically, soybean in which tolerance to glyphosate is imparted to a non-transgenic soybean scion using Roundup Ready (registered trademark) soybean having tolerance to glyphosate as a rootstock (see Weed Technology 2013, 27, 412) can be mentioned as an example.

Hereinbelow, examples of a plant imparted with pest resistance will be mentioned.

Examples of a plant imparted with resistance to a lepidopteran pest by a transgenic technique include corn (*Zea mays* L.), soybean (*Glycine max* L.), cotton (*Gossypium hirsutum* L.), rice (*Oryza sativa* L.), poplar (*Populus* sp.), tomato (*Lycopersicon esculentum*), eggplant (*Solanum melongena*) and sugar cane (*Saccharum* sp.) each having, introduced therein, a gene encoding δ-endotoxin which is an insecticidal protein originated from *Bacillus thuringiensis* (abbreviated as "Bt bacterium", hereinafter), which is a soil bacterium. Examples of a δ-endotoxin imparting resistance to a lepidopteran pest include Cry1A, Cry1Ab, modified Cry1Ab (partly defective Cry1Ab), Cry1Ac, Cry1Ab-Ac (hybrid protein in which Cry1Ab and Cry1Ac are fused), Cry1C, Cry1F, Cry1Fa2 (modified cry1F), moCry1F (modified Cry1F), Cry1A.105 (hybrid protein in which Cry1Ab, Cry1Ac and Cry1F are fused), Cry2Ab2, Cry2Ae, Cry9C, Vip3A and Vip3Aa20.

Examples of a plant imparted with resistance to a coleopteran pest by a transgenic technique include corn and potato having, introduced therein, a gene encoding a δ-endotoxin which is an insecticidal protein originated from a Bt bacterium, which is a soil bacterium. Examples of a δ-endotoxin imparting resistance to a coleopteran pest include Cry3A, mCry3A (modified Cry3A), Cry3Bb1, Cry34Ab1, Cry35Ab1, Cry6A, Cry6Aa and mCry6Aa (modified Cry6Aa).

Examples of a plant imparted with resistance to a dipterous pest by a transgenic technique include corn (*Zea mays* L.) having, introduced therein, a synthesized gene encoding a hybrid protein eCry3.1Ab in which Cry3A and Cry1Ab are fused originated from a Bt bacterium, which is a soil bacterium, and cotton (*Gossypium hirsutum* L.) having, introduced therein, a gene encoding a trypsin inhibitor CpTI originated from black-eyed pea (*Vigna unguiculata*). Examples thereof further include poplar having, introduced therein, a gene encoding API which is a protease inhibitor protein A originated from arrowhead (*Sagittaria sagittifolia*) and the like, which shows resistance to a wide range of pests.

Examples of an insecticidal protein imparting pest resistance to a plant also include a hybrid protein, a partially defective protein and a modified protein of the above-mentioned insecticidal protein. The hybrid protein is produced by a combination of different domains of a plurality of insecticidal proteins using a transgenic technique, and Cry1Ab-Ac and Cry1A.105 and the like are known. As the partially defective protein, Cry1Ab in which an amino acid sequence is partially defective and the like is known. As the modified protein, a protein in which one or a plurality of amino acid(s) of a natural δ-endotoxin is/are substituted, i.e., Cry1Fa2, moCry1F and mCry3A and the like are known. The modified protein also includes a case where a non-naturally occurring protease recognition sequence is inserted into a toxin, and examples thereof include Cry3A055 in which a cathepsin G-recognition sequence is inserted into a Cry3A toxin (see WO 2003/018810).

Cotton (event MON88702) having, introduced therein, a BT protein Cry51Aa2 (Cry51Aa2.834_16) modified by a transgenic technique has been developed by Monsanto Company, and it shows resistance to the genus *Lygus* such as *Lygus lineolaris*, *Hemiptera* such as aphid and *Thysanoptera* such as the genus *Frankliniella*.

Examples of other insecticidal proteins imparting pest resistance to a plant by a transgenic technique include: an insecticidal protein originated from *Bacillus cereus* or *Bacillus popilliae*; plant insecticidal proteins Vip1, Vip2, Vip3 (as a subclass, Vip3Aa to Vip3Aj, Vip3Ba, Vip3B and Vip3Ca are known, and specifically, for example, Vip3Aa20 and Vip3Aa61 are known) and Vip4; an insecticidal protein originated from bacteria symbiosing with nematode (making a colony in nematode) including *Photorhabdus* spp. such as *Photorhabdus luminescens* or *Xenorhabdus* spp. such as *Xenorhabdus nematophilus*; a toxin produced by an animal containing an insect-specific neurotoxin such as a scorpion toxin, a spider toxin and a bee toxin; a toxin produced by filamentous fungi such as a *Streptomycetes toxin*; plant lectin such as pea lectin, barley lectin and snow drop lectin; agglutinin; a protease inhibitor such as a trypsin inhibitor, a serine protease inhibitor, patatin, cystatin and a papain inhibitor; a ribosome-inactivating protein (RIP) such as ricin, corn-RIP, abrin, luffin, saporin and bryodin; a steroid-metabolizing enzyme such as 3-hydroxysteroid oxidase, ecdysteroid-UDP-glucosyltransferase and cholesterol oxidase; an ecdysone inhibitor; HMG-CoA-reductase; an ion channel inhibitor such as a sodium channel inhibitor and a calcium channel inhibitor; juvenile hormone esterase; a diuretic hormone receptor; stilbene synthase; bibenzyl synthase; chitinase; and glucanase.

A plant imparted with pest resistance by introducing one or two or more insecticidal protein gene(s) has been already known, and some plants are commercially available.

Examples of cotton imparted with pest resistance include: "Bollgard (trademark) cotton", "BXN (trademark) Plus Bollgard (trademark) Cotton", "BXN (trademark) Plus Bollgard (trademark) Cotton", "JK 1", "Roundup Ready (trademark) Bollgard (trademark) Cotton" and "Ingard (trademark)" each of which expresses an insecticidal protein Cry1Ac originated from a Bt bacterium; "Herculex (trademark) I" and "Herculex (trademark) CB" each of which expresses an insecticidal protein modified Cry1F (Cry1Fa2) originated from a Bt bacterium; "VIPCOT (trademark) Cotton" which expresses an insecticidal protein Vip3A originated from a Bt bacterium; "Bollgard II (trademark) cotton", "Roundup Ready (trademark) Bollgard II (trademark) Cotton", "Roundup Ready (trademark) Flex (trademark) Bollgard II (trademark) Cotton" and "Fivermax (trademark) Liberty Link (trademark) Bollgard II (trademark)" each of which expresses insecticidal proteins Cry1Ac and Cry2Ab originated from a Bt bacterium; "Bollgard III (registered trademark)" and "Bollgard (registered trademark) III×Roundup Ready (trademark) Flex (trademark)" each of which expresses insecticidal proteins Cry1Ac, Cry2Ab and Vip3A originated from a Bt bacterium; "VIPCOT (trademark) Roundup Ready Flex (trademark) Cotton" which expresses insecticidal proteins Vip3A and Cry1Ab originated from a Bt bacterium; "VIPCOT (registered trademark) Cotton" which expresses insecticidal proteins Vip3A and Cry1Ac originated from a Bt bacterium; "WideStrike (trademark) Cotton", "WideStrike (trademark) Roundup Ready (trademark) Cotton" and "Widestrike (trademark) Roundup Ready Flex (trademark) Cotton" each of which expresses insecticidal proteins Cry1Ac and Cry1F originated from a Bt bacterium; "Twinlink (trademark) Cotton" and "Glytol (trademark)×Twinlink (trademark)" each of which expresses insecticidal proteins Cry1Ab and Cry2Ae originated from a Bt bacterium; "Widestrike (registered trademark) 3" and "Widestrike (trademark)× Roundup Ready Flex (trademark)×VIPCOT (trademark) Cotton" each of which expresses insecticidal proteins Cry1Ac, Cry1F and Vip3A originated from a Bt bacterium; and "Glytol (trademark)×Twinlink (trademark)×VIPCOT (trademark) Cotton" which expresses insecticidal proteins Cry1Ab, Cry2Ae and Vip3A originated from a Bt bacterium, all of which are commercially available.

Examples of corn imparted with pest resistance include: "YieldGard (registered trademark) Rootworm RW", "YieldGard (trademark) RW+RR", "YieldGard (trademark) VT (trademark) Rootworm (trademark) RR2" and "MaxGard (trademark)" each of which expresses an insecticidal protein Cry3Bb1 originated from a Bt bacterium; "YieldGard (registered trademark) VT Triple" and "YieldGard (trademark) Plus with RR" each of which expresses insecticidal proteins Cry3Bb1 and Cry1Ab originated from a Bt bacterium; "Bt Xtra (trademark) Maize" which expresses an insecticidal protein Cry1Ac originated from a Bt bacterium; "YieldGard Plus (registered trademark)" which expresses insecticidal proteins Cry1Ab and Cry3Bb1 originated from a Bt bacterium; "Bt10", "Liberty Link (trademark) Yieldgard (trademark) Maize", "Agrisure (trademark) GT/CB/LL" and "YieldGard (trademark) CB+RR" each of which expresses an insecticidal protein Cry1Ab originated from a Bt bacterium; "YieldGard (trademark) VT Pro (trademark)" and "tenuity (registered trademark) VT Double Pro (trademark)" each of which expresses insecticidal proteins Cry1A.105 and Cry2Ab2 originated from a Bt bacterium; "Agrisure (registered trademark) RW" and "Agrisure (trademark) GT/RW" each of which expresses an insecticidal protein mCry3A originated from a Bt bacterium; "Starlink (trademark) Maize" which expresses an insecticidal protein Cry9C originated from a Bt bacterium; "YieldGard (trademark)", "MaizeGard (trademark)", "NaturGard KnockOut (trademark)", "Maximizer (trademark)", "Roundup Ready (trademark) YieldGard (trademark) maize", "Agrisure (trademark) CB/LL" and "Mavera (trademark) YieldGard (trademark) Maize" each of which expresses an insecticidal protein Cry1Ab originated from a Bt bacterium; "Agrisure (registered trademark) 3122" which expresses insecticidal proteins Cry1Ab, Cry1F, modified Cry3A, Cyr34Ab1 and Cyr35Ab1 originated from a Bt bacterium; "Agrisure (registered trademark) Viptera" which expresses an insecticidal protein Vip3Aa20 originated from a Bt bacterium; "Agrisure (registered trademark) Viptera (trademark) 2100" and "Agrisure (registered trademark) Viptera (trademark) 3110" each of which expresses insecticidal proteins Vip3Aa20 and Cry1Ab originated from a Bt bacterium; "Agrisure (registered trademark) Viptera (trademark) 3100", "Agrisure (registered trademark) Viptera (trademark) 3111) and "Agrisure (registered trademark) Viptera (trademark) 4" each of which expresses insecticidal proteins Vip3Aa20, Cry1Ab and modified Cry3A originated from a Bt bacterium; "Agrisure (registered trademark) Viptera (trademark) 3220" which expresses insecticidal proteins Vip3Aa20, Cry1Ab and modified Cry1F originated from a Bt bacterium; "Agrisure (registered trademark) Duracade (trademark)" which expresses an insecticidal protein eCry3.1Ab (chimeric protein of Cry3A-Cry1Ab) originated from a Bt bacterium; "Agrisure (registered trademark) Duracade (trademark) 5122" which expresses insecticidal proteins eCry3.1Ab (chimeric protein of Cry3A-Cry1Ab), modified Cry3A, Cry1Ab and modified Cry1F originated from a Bt bacterium; "Agrisure (registered trademark) Duracade (trademark) 5222" which expresses insecticidal proteins eCry3.1Ab (chimeric protein of Cry3A-Cry1Ab), modified Cry3A, modified Cry1Ab and Vip3A variant originated from a Bt bacterium; "Herculex (trademark) RW" which expresses insecticidal proteins Cyr34Ab1 and Cyr35Ab1 originated from a Bt bacterium; "Herculex XTRA (trademark)" which expresses insecticidal proteins Cyr34Ab1, Cyr35Ab1 and Cry1F originated from a Bt bacterium; "Genuity (registered trademark) VT Triple Pro (trademark)" which expresses insecticidal proteins Cry1A.105, Cry2Ab2 and Cry3Bb1 originated from a Bt bacterium; "Genuity (registered trademark) SmartStax (trademark)" which expresses insecticidal proteins Cry1F, Cry2Ab, Cyr34Ab1, Cyr35Ab1, Cry3Bb1 and Cry1A.105 originated from a Bt bacterium; "Power Core (trademark)" which expresses insecticidal proteins modified Cry1F, Cry1Ab and Cry1A.105 originated from a Bt bacterium; "Herculex XTRA (trademark) RR" which expresses insecticidal proteins modified Cry1F, Cyr34Ab1 and Cyr35Ab1 originated from a Bt bacterium; "Optimum (registered trademark) Intrasect Xtreme" which expresses insecticidal proteins modified Cry1F, Cyr34Ab1, Cyr35Ab1, Cry1Ab and modified Cry3A originated from a Bt bacterium; "Optimum (registered trademark) Intrasect XTRA" which expresses insecticidal proteins modified Cry1F, Cyr34Ab1, Cyr35Ab1 and Cry1Ab originated from a Bt bacterium; and "Optimum (registered trademark) TRIsect" which expresses insecticidal proteins modified Cry1F and modified Cyr3A originated from a Bt bacterium, all of which are commercially available.

Examples of other plants imparted with pest resistance include: potato "Atlantic NewLeaf (trademark) potato", "NewLeaf (trademark) Russet Burbank potato", "Lugovskoi plus", "Elizaveta plus", "Hi-Lite NewLeaf (trademark) Y potato, Superior NewLeaf (trademark) potato" and "Shepody NewLeaf (trademark) Y potato" each of which expresses an insecticidal protein Cry3A originated from a Bt bacterium; rice "hanyou 63" and "Huahui-1" each of which expresses insecticidal proteins Cry1Ab and Cry1Ac originated from a Bt bacterium; soybean "Intacta (trademark) Roundup Ready (trademark) 2 Pro" which expresses an insecticidal protein Cry1Ac originated from a Bt bacterium; and eggplant "BARI Bt Begun-1, -2, -3 and -4" which expresses an insecticidal protein Cry1Ac originated from a Bt bacterium, all of which are commercially available.

The following plants are also known: corn "YieldGard corn rootworm", "YieldGard VT", "Herculex RW", "Herculex Rootworm" and "Agrisure CRW" each having resistance to corn rootworm; corn "YieldGard corn borer", "YieldGard plus", "YieldGard VT Pro", "Agrisure CB/LL", "Agrisure 3000GT", "Hercules I", "Hercules II", "KnockOut", "NatureGard" and "StarLink" each having resistance to corn borer; corn "Herculex I", "Herculex Xtra", "NewLeaf", "NewLeaf Y" and "NewLeaf Plus" each having resistance to western bean cutworm, corn borer, black cutworm and fall armyworm; corn "YieldGard Plus" having resistance to corn borer and corn rootworm; cotton "Bollgard I" and "Bollgard II" each having resistance to tobacco budworm; cotton "Bollgard II", "WideStrike (trademark)" and "VipCot" each having resistance to tobacco budworm, cotton bollworm, fall armyworm, beet armyworm, cabbage looper, soybean looper and pink bollworm; potato "NewLeaf", "NewLeaf Y" and "NewLeaf Plus" each having resistance to tobacco hornworm; and eggplant "Bt brinjal", "Dumaguete Long Purple" and "Mara" each having resistance to eggplant fruit and shoot borer, fruit borer and cotton bollworm (see, for example, U.S. Pat. No. 5,128, 130).

A further plant having pest resistance is generally known, and examples thereof include rice having resistance to yellow stem borer (see, for example, Molecular Breeding, vol. 18 (2006), No. 1), lettuce having resistance to Lepidoptera (see, for example, U.S. Pat. No. 5,349,124) and rice having resistance to Lepidoptera (e.g., Asiatic rice borer, straight swift, Asiatic pink stem borer, rice leafroller, rice caseworm and rice armyworm) (see, for example, WO 2001/021821). A method for producing such plant is generally known by a person skilled in the art, and, for example, is mentioned in the above-mentioned publication.

As a plant imparted with pest resistance by an RNA interference technique, corn having resistance to a lepidopteran pest (e.g., corn borers, corn earworm, cutworms such as black cutworm, and fall armyworm) and a coleopteran pest (corn rootworms) is commercially available or developed by the trade name of "SmartStax (registered trademark)", "SmartStax (registered trademark) Pro" or "Genuity (registered trademark) SmartStax Pro".

Examples of a plant imparted with pest resistance by a conventional breeding technique or genome-based breeding technique include: soybean having resistance to soybean aphid (*Aphis glycines*) having a "Rag1 (Resistance to *Aphis glycines* 1)" gene or a "Rag2 (Resistance to *Aphis glycines* 2)" gene, which is a gene having resistance to aphid (see J. Econ. Entomol., 2015, 108, 326.); soybean having resistance to soybean cyst nematode (*Heterodera glycines*) (see Phytopathology, 2016, 106, 1444.); cotton having resistance to root-knot nematode (*Meloidogyne incognita*) (J. Nematol., 2009, 41, 140); rice "KANTO BPH1" having resistance to brown planthopper; and soybean "FUKUMINORI" having resistance to Oriental leafworm moth.

These plants imparted with pest resistance are imparted with resistance to any harmful insect (particularly, a lepidopteran insect, a coleopteran insect, a dipterous insect, a coleopteran insect), harmful spiders and harmful nematodes. The plant imparted with pest resistance is preferably selected from winter cereals (e.g., wheat, barley, rye, oat), corn, canola, sorghum, soybean, rice, rapeseed, sugar beet, sugar cane, grape, lentil, sunflower, alfalfa, pome fruits, stone fruits, peanuts, coffee, tea, strawberries, lawn grass and vegetables (e.g., tomato, potato, Cucurbitaceae plants and lettuce), more preferably selected from soybean, tomato, rice and winter cereals (e.g., wheat, barley, rye and oat), and most preferably selected from soybean, rice, corn and winter cereals (e.g., wheat, barley, rye and oat).

In the present method, the present PPO and the present glufosinate are applied to the place where weeds are growing or will grow. Examples of the method for applying the present PPO and the present glufosinate include a method for spraying a spray liquid containing the present PPO and the present glufosinate on the soil and a method for spraying the spray liquid to weeds.

The application rate of the present PPO and the present glufosinate is, as the total amount of the present PPO and the present glufosinate, usually 100 to 2,000 g per 10,000 m$^2$, preferably 200 to 1,000 g per 10,000 m$^2$, and more preferably 400 to 600 g per 10,000 m$^2$.

In the present method, the present PPO and the present glufosinate may be used in combination with an adjuvant.

The type of the adjuvant is not particularly limited, and examples of the adjuvant include oil-based adjuvants such as Agri-Dex and MSO, nonionic adjuvants (ester or ether of polyoxyethylene) such as Induce, anionic adjuvants (substituted sulfonate) such as Gramin S, cationic adjuvants (polyoxyethylene amine) such as Genamin T 200BM, and organosilicon-based adjuvants such as Silwet L77.

The pH and hardness of the spray liquid prepared when applying the present PPO and the present glufosinate are not particularly limited, and the pH is usually within a range of 5 to 9 and the hardness is usually within a range of 0 to 500 ppm as American hardness.

The period of time for applying the present PPO and the present glufosinate is not particularly limited, and the period of time is usually within a range of 5 a.m. to 9 p.m. and the photon flux density is usually 10 to 2,500 μmol/m$^2$/second.

When the present PPO and the present glufosinate are applied to a crop field, the present PPO and the present glufosinate may be applied to the crop field before seeding crop seeds and the present PPO and the present glufosinate may be applied simultaneously with and/or after seeding crop seeds. Namely, the present PPO and the present glufosinate are applied once before, simultaneously with, or after seeding crop seeds; twice except before seeding crop seeds, twice except simultaneously with seeding crop seeds, or twice except after seeding crop seeds; or three times before, simultaneously with, and after seeding crop seeds.

When the present PPO and the present glufosinate are applied before seeding crop seeds, the present PPO and the present glufosinate are applied from 50 days before seeding to immediately before seeding, preferably from 30 days before seeding to immediately before seeding, more preferably from 20 days before seeding to immediately before seeding, and still more preferably from 10 days before seeding to immediately before seeding.

When the present PPO and the present glufosinate are applied after seeding crop seeds, the present PPO and the present glufosinate are applied usually from immediately after seeding to before flowering. The present PPO and the present glufosinate are applied more preferably from immediately after seeding to before sprouting, and/or from 1 to 6 leaf stages of crops.

The case where the present PPO and the present glufosinate are applied simultaneously with seeding the crop seeds is the case where a sowing machine and a spraying machine are integrated with each other.

Specific examples of weeds to be controlled by the present composition or the present method include, but are not limited to, the following weeds.

Urticaceae weeds: small nettle (*Urtica urens*)

Polygonaceae weeds: black bindweed (*Polygonum convolvulus*), pale persicaria (*Polygonum lapathifolium*), Pennsylvania smartweed (*Polygonum pensylvanicum*), redshank (*Polygonum persicaria*), bristly lady's-thumb (*Polygonum longisetum*), knotgrass (*Polygonum aviculare*), equal-leaved knotgrass (*Polygonum arenastrum*), Japanese knotweed (*Polygonum cuspidatum*), Japanese dock (*Rumex japonicus*), curly dock (*Rumex crispus*), blunt-leaved dock (*Rumex obtusifolius*), common sorrel (*Rumex acetosa*)

Portulacaceae weeds: common purslane (*Portulaca oleracea*)

Caryophyllaceae weeds: common chickweed (*Stellaria media*), water chickweed (*Stellaria aquatica*), common mouse-ear (*Cerastium holosteoides*), sticky mouse-ear (*Cerastium glomeratum*), corn spurrey (*Spergula arvensis*), five-wound catchfly (*Silene gallica*)

Molluginaceae weeds: carpetweed (*Mollugo verticillata*)

Chenopodiaceae weeds: common lambsquarters (*Chenopodium album*), Indian goosefoot (*Chenopodium ambrosioides*), kochia (*Kochia scoparia*), spiny saltwort (*Salsola kali*), Orach (*Atriplex* spp.)

Amaranthaceae weeds: redroot pigweed (*Amaranthus retroflexus*), slender amaranth (*Amaranthus viridis*), livid amaranth (*Amaranthus lividus*), spiny amaranth (*Amaranthus spinosus*), smooth pigweed (*Amaranthus hybridus*), Palmer amaranth (*Amaranthus palmeri*), green pigweed (*Amaranthus patulus*), waterhemp (*Amaranthus tuberculatus=Amaranthus rudis=Amaranthus tamariscinus*), prostrate pigweed (*Amaranthus blitoides*), large-fruit amaranth (*Amaranthus deflexus*), mucronate amaranth (*Amaranthus quitensis*), alligator weed (*Alternanthera philoxeroides*), sessile alligator weed (*Alternanthera sessilis*), perrotleaf (*Alternanthera tenella*)

Papaveraceae weeds: common poppy (*Papaver rhoeas*), field poppy (*Papaver dubium*), Mexican prickle poppy (*Argemone mexicana*)

Brassicaceae weeds: wild radish (*Raphanus raphanistrum*), radish (*Raphanus sativus*), wild mustard (*Sinapis arvensis*), shepherd's purse (*Capsella bursa-pastoris*), white mustard (*Brassica juncea*), oilseed rape (*Brassica napus*), pinnate tansy mustard (*Descurainia pinnata*), marsh yellowcress (*Rorippa islandica*), yellow fieldcress (*Rorippa sylvestris*), field pennycress (*Thlaspi arvense*), turnip weed (*Myagrum rugosum*), Virginia pepperweed (*Lepidium virginicum*), slender wartcress (*Coronopus didymus*)

Capparaceae weeds: African cabbage (*Cleome affinis*)

Fabaceae weeds: Indian joint vetch (*Aeschynomene indica*), zigzag joint vetch (*Aeschynomene rudis*), hemp sesbania (*Sesbania exaltata*), sickle pod (*Cassia obtusifolia*), coffee senna (*Cassia occidentalis*), Florida beggar weed (*Desmodium tortuosum*), wild groundnut (*Desmodium adscendens*), Illinois tick trefoil (*Desmodium illinoense*), white clover (*Trifolium repens*), kudzu (*Pueraria lobata*), narrowleaf vetch (*Vicia angustifolia*), hairy indigo (*Indigofera hirsuta*), *Indigofera truxillensis*, common cowpea (*Vigna sinensis*)

Oxalidaceae weeds: creeping wood sorrel (*Oxalis corniculata*), European wood sorrel (*Oxalis stricta*), purple shamrock (*Oxalis oxyptera*)

Geraniaceae weeds: Carolina geranium (*Geranium carolinense*), common storksbill (*Erodium cicutarium*)

Euphorbiaceae weeds: sun spurge (*Euphorbia helioscopia*), annual spurge (*Euphorbia maculata*), prostrate spurge (*Euphorbia humistrata*), Hungarian spurge (*Euphorbia esula*), wild poinsettia (*Euphorbia heterophylla*), hyssop-leaf sandmat (*Euphorbia brasiliensis*), Asian copperleaf (*Acalypha australis*), tropic croton (*Croton glandulosus*), lobed croton (*Croton lobatus*), long-stalked phyllanthus (*Phyllanthus corcovadensis*), castor bean (*Ricinus communis*)

Malvaceae weeds: velvetleaf (*Abutilon theophrasti*), arrow-leaf sida (*Sida rhombifolia*), heart-leaf sida (*Sida cordifolia*), prickly sida (*Sida spinosa*), *Sida glaziovii*, *Sida santaremnensis*, bladder weed (*Hibiscus trionum*), spurred anoda (*Anoda cristata*), spine-seeded false-mallow (*Malvastrum coromandelianum*)

Onagraceae weeds: *Ludwigia epilobioides*, long-fruited primrose willow (*Ludwigia octovalvis*), winged water primrose (*Ludwigia decurrens*), common evening-primrose (*Oenothera biennis*), cutleaf evening-primrose (*Oenothera laciniata*)

Sterculiaceae weeds: Florida waltheria (*Waltheria indica*)

Violaceae weeds: field violet; *Viola arvensis*, wild violet; *Viola tricolor*

Cucurbitaceae weeds: bur cucumber (*Sicyos angulatus*), wild cucumber (*Echinocystis lobata*), bitter balsam apple (*Momordica charantia*)

Lythraceae weeds: *Ammannia multiflora*, eared redstem (*Ammannia auriculata*), scarlet toothcup (*Ammannia coccinea*), purple loosestrife (*Lythrum salicaria*), Indian toothcup (*Rotala indica*)

Elatinaceae weeds: three-stamen waterwort (*Elatine triandra*), California waterwort (*Elatine californica*)

Apiaceae weeds: Chinese celery (*Oenanthe javanica*), wild carrot (*Daucus carota*), carrot fern (*Conium maculatum*)

Araliaceae weeds: lawn pennywort (*Hydrocotyle sibthorpioides*), floating pennywort (*Hydrocotyle ranunculoides*)

Ceratophyllaceae weeds: common hornwort (*Ceratophyllum demersum*)

Cabombaceae weeds: Carolina fanwort (*Cabomba caroliniana*)

Haloragaceae weeds: Brazilian water milfoil (*Myriophyllum aquaticum*), whorled water milfoil (*Myriophyllum verticillatum*), water milfoils (*Myriophyllum spicatum, Myriophyllum heterophyllum*, etc.)

Sapindaceae weeds: heartseed (*Cardiospermum halicacabum*)

Primulaceae weeds: scarlet pimpernel (*Anagallis arvensis*)

Asclepiadaceae weeds: common milkweed (*Asclepias syriaca*), honeyvine milkweed (*Ampelamus albidus*)

Rubiaceae weeds: catchweed bedstraw (*Galium aparine*), *Galium spurium* var. *echinospermon*, broadleaf buttonweed (*Spermacoce latifolia*), Brazil calla lily (*Richardia brasiliensis*), broadleaf buttonweed (*Borreria alata*)

Convolvulaceae weeds: Japanese morning glory (*Ipomoea nil*), ivy-leaf morning glory (*Ipomoea hederacea*), tall morning glory (*Ipomoea purpurea*), entire-leaf morning glory (*Ipomoea hederacea* var. *integriuscula*), pitted morning glory (*Ipomoea lacunosa*), three-lobe morning glory (*Ipomoea triloba*), blue morning glory (*Ipomoea acuminata*), scarlet morning glory (*Ipomoea hederifolia*), red morning glory (*Ipomoea coccinea*), cypress-vine morning glory (*Ipomoea quamoclit*), *Ipomoea grandifolia, Ipomoea aristolochiaefolia*, Cairo morning glory (*Ipomoea cairica*), field bindweed (*Convolvulus arvensis*), Japanese false bindweed (*Calystegia hederacea*), Japanese bindweed (*Calystegia japonica*), ivy woodrose (*Merremia hederacea*), hairy woodrose (*Merremia aegyptia*), roadside woodrose (*Merremia cissoides*), small-flower morning glory (*Jacquemontia tamnifolia*)

Boraginaceae weeds: field forget-me-not (*Myosotis arvensis*)

Lamiaceae weeds: purple deadnettle (*Lamium purpureum*), common henbit (*Lamium amplexicaule*), lion's ear (*Leonotis nepetaefolia*), wild spikenard (*Hyptis suaveolens*), *Hyptis lophanta*, Siberian motherwort (*Leonurus sibiricus*), field-nettle betony (*Stachys arvensis*)

Solanaceae weeds: jimsonweed (*Datura stramonium*), black nightshade (*Solanum nigrum*), American black nightshade (*Solanum americanum*), eastern black nightshade (*Solanum ptycanthum*), hairy nightshade (*Solanum sarrachoides*), buffalo bur (*Solanum rostratum*), soda-apple nightshade (*Solanum aculeatissimum*), sticky nightshade (*Solanum sisymbriifolium*), horse nettle (*Solanum carolinense*), cutleaf groundcherry (*Physalis angulata*), smooth groundcherry (*Physalis subglabrata*), apple of Peru (*Nicandra physalodes*)

Scrophulariaceae weeds: ivyleaf speedwell (*Veronica hederaefolia*), common speedwell (*Veronica persica*), corn speedwell (*Veronica arvensis*), common false pimpernel (*Lindernia procumbens*), false pimpernel (*Lindernia dubia*), *Lindernia angustifolia*, round-leaf water hyssop (*Bacopa rotundifolia*), dopatrium (*Dopatrium junceum*), *Gratiola japonica*, Plantaginaceae weeds: Asiatic plantain (*Plantago asiatica*), narrow-leaved plantain (*Plantago lanceolata*), broadleaf plantain (*Plantago major*), marsh water starwort (*Callitriche palustris*)

Asteraceae weeds: common cocklebur (*Xanthium pensylvanicum*), large cocklebur (*Xanthium occidentale*), Canada cocklebur (*Xanthium italicum*), common sunflower (*Helianthus annuus*), wild chamomile (*Matricaria chamomilla*), scentless chamomile (*Matricaria perforata*), corn marigold (*Chrysanthemum segetum*), rayless mayweed (*Matricaria matricarioides*), Japanese mugwort (*Artemisia princeps*), common mugwort (*Artemisia vulgaris*), Chinese mugwort (*Artemisia verlotorum*), tall goldenrod (*Solidago altissima*), common dandelion (*Taraxacum officinale*), hairy galinsoga (*Galinsoga ciliata*), small-flower galinsoga (*Galinsoga parviflora*), common groundsel (*Senecio vulgaris*), flower-of-souls (*Senecio brasiliensis*), *Senecio grisebachii*, fleabane (*Conyza bonariensis*), Guernsey fleabane (*Conyza sumatrensis*), marestail (*Conyza canadensis*), common ragweed (*Ambrosia artemisiifolia*), giant ragweed (*Ambrosia trifida*), three-cleft burmarigold (*Bidens tripartita*), hairy beggarticks (*Bidens pilosa*), common beggarticks (*Bidens frondosa*), greater beggarticks (*Bidens subalternans*), Canada thistle (*Cirsium arvense*), black thistle (*Cirsium vulgare*), blessed milkthistle (*Silybum marianum*), musk thistle (*Carduus nutans*), prickly lettuce (*Lactuca serriola*), annual sowthistle (*Sonchus oleraceus*), spiny sowthistle (*Sonchus asper*), beach creeping oxeye (*Wedelia glauca*), perfoliate blackfoot (*Melampodium perfoliatum*), red tasselflower (*Emilia sonchifolia*), wild marigold (*Tagetes minuta*), para cress (*Blainvillea latifolia*), coat buttons (*Tridax procumbens*), Bolivian coriander (*Porophyllum ruderale*), Paraguay starbur (*Acanthospermum australe*), bristly starbur (*Acan-

*thospermum hispidum*), balloon vine (*Cardiospermum halicacabum*), tropic ageratum (*Ageratum conyzoides*), common boneset (*Eupatorium perfoliatum*), fireweed (*Erechtites hieracifolia*), American cudweed (*Gamochaeta spicata*), linear-leaf cudweed (*Gnaphalium spicatum*), *Jaegeria hirta*, ragweed parthenium (*Parthenium hysterophorus*), small yellow crownbeard (*Siegesbeckia orientalis*), lawn burweed (*Soliva sessilis*), white eclipta (*Eclipta prostrata*), American false daisy (*Eclipta alba*), spreading sneezeweed (*Centipeda minima*)

Alismataceae weeds: dwarf arrowhead (*Sagittaria pygmaea*), threeleaf arrowhead (*Sagittaria trifolia*), arrowhead (*Sagittaria sagittifolia*), giant arrowhead (*Sagittaria montevidensis*), *Sagittaria aginashi*, channelled water plantain (*Alisma canaliculatum*), common water plantain (*Alisma plantago-aquatica*)

Limnocharitaceae weeds: Sawah flowering rush (*Limnocharis flava*)

Hydrocharitaceae weeds: American frogbit (*Limnobium spongia*), Florida elodea (*Hydrilla verticillata*), common water nymph (*Najas guadalupensis*)

Araceae weeds: Nile cabbage (*Pistia stratiotes*)

Lemnaceae weeds: three-nerved duckweed (*Lemna aoukikusa, Lemna paucicostata, Lemna aequinoctialis*), common duckmeat (*Spirodela polyrhiza*), *Wolffia* spp.

Potamogetonaceae weeds: roundleaf pondweed (*Potamogeton distinctus*), pondweeds (*Potamogeton crispus, Potamogeton illinoensis, Stuckenia pectinata*, etc.)

Liliaceae weeds: wild onion (*Allium canadense*), wild garlic (*Allium vineale*), Chinese garlic (*Allium macrostemon*)

Pontederiaceae weeds: common water hyacinth (*Eichhornia crassipes*), blue mud plantain (*Heteranthera limosa*), *Monochoria korsakowii*, heartshape false pickerelweed (*Monochoria vaginalis*)

Commelinaceae weeds: common dayflower (*Commelina communis*), tropical spiderwort (*Commelina benghalensis*), erect dayflower (*Commelina erecta*), Asian spiderwort (*Murdannia keisak*)

Poaceae weeds: common barnyardgrass (*Echinochloa crus-galli*), early barnyardgrass (*Echinochloa oryzicola*), barnyard grass (*Echinochloa crus-galli* var *formosensis*), late watergrass (*Echinochloa oryzoides*), jungle rice (*Echinochloa colonum*), Gulf cockspur (*Echinochloa crus-pavonis*), green foxtail (*Setaria viridis*), giant foxtail (*Setaria faberi*), yellow foxtail (*Setaria glauca*), knotroot foxtail (*Setaria geniculata*), southern crabgrass (*Digitaria ciliaris*), large crabgrass (*Digitaria sanguinalis*), Jamaican crabgrass (*Digitaria horizontalis*), sourgrass (*Digitaria insularis*), goosegrass (*Eleusine indica*), annual bluegrass (*Poa annua*), rough-stalked meadowgrass (*Poa trivialis*), Kentucky bluegrass (*Poa pratensis*), short-awn foxtail (*Alopecurus aequalis*), blackgrass (*Alopecurus myosuroides*), wild oat (*Avena fatua*), Johnsongrass (*Sorghum halepense*), shataken (grain sorghum; *Sorghum vulgare*), quackgrass (*Agropyron repens*), Italian ryegrass (*Lolium multiflorum*), perennial ryegrass (*Lolium perenne*), bomugi (rigid ryegrass; *Lolium rigidum*), rescue brome (*Bromus catharticus*), downy brome (*Bromus tectorum*), Japanese brome grass (*Bromus japonicus*), cheat (*Bromus secalinus*), cheatgrass (*Bromus tectorum*), foxtail barley (*Hordeum jubatum*), jointed goatgrass (*Aegilops cylindrica*), reed canarygrass (*Phalaris arundinacea*), little-seed canary grass (*Phalaris minor*), silky bentgrass (*Apera spica-venti*), fall panicum (*Panicum dichotomiflorum*), Texas panicum (*Panicum texanum*), guineagrass (*Panicum maximum*), broadleaf signalgrass (*Brachiaria platyphylla*), Congo signal grass (*Brachiaria ruziziensis*), Alexander grass (*Brachiaria plantaginea*), Surinam grass (*Brachiaria decumbens*), palisade grass (*Brachiaria brizantha*), creeping signalgrass (*Brachiaria humidicola*), southern sandbur (*Cenchrus echinatus*), field sandbur (*Cenchrus pauciflorus*), woolly cupgrass (*Eriochloa villosa*), feathery pennisetum (*Pennisetum setosum*), Rhodes grass (*Chloris gayana*), feathertop Rhodes grass (*Chloris virgata*), India lovegrass (*Eragrostis pilosa*), Natal grass (*Rhynchelytrum repens*), crowfoot grass (*Dactyloctenium aegyptium*), winkle grass (*Ischaemum rugosum*), swamp millet (*Isachne globosa*), common rice (*Oryza sativa*), bahiagrass (*Paspalum notatum*), coastal sand paspalum (*Paspalum maritimum*), mercergrass (*Paspalum distichum*), kikuyugrass (*Pennisetum clandestinum*), West Indies pennisetum (*Pennisetum setosum*), itch grass (*Rottboellia cochinchinensis*), Asian sprangletop (*Leptochloa chinensis*), salt-meadow grass (*Leptochloa fascicularis*), Christmas-tree grass (*Leptochloa filiformis*), Amazon sprangletop (*Leptochloa panicoides*), Japanese cutgrass (*Leersia japonica*), *Leersia sayanuka*, cutgrass (*Leersia oryzoides*), *Glyceria leptorrhiza*, sharpscale mannagrass (*Glyceria acutiflora*), great watergrass (*Glyceria maxima*), redtop (*Agrostis gigantea*), carpet bent (*Agrostis stolonifera*), Bermuda grass (*Cynodon dactylon*), cocksfoot (*Dactylis glomerata*), centipede grass (*Eremochloa ophiuroides*), tall fescue (*Festuca arundinacea*), red fescue (*Festuca rubra*), lalang (*Imperata cylindrica*), Chinese fairy grass (*Miscanthus sinensis*), switchgrass (*Panicum virgatum*), Japanese lawngrass (*Zoysia japonica*)

Cyperaceae weeds: Asian flatsedge (*Cyperus microiria*), rice flatsedge (*Cyperus iria*), hedgehog cyperus (*Cyperus compressus*), small-flowered nutsedge (*Cyperus difformis*), lax-flat sedge (*Cyperus flaccidus*), *Cyperus globosus, Cyperus nipponicus*, fragrant flatsedge (*Cyperus odoratus*), mountain nutsedge (*Cyperus serotinus*), purple nutsedge (*Cyperus rotundus*), yellow nutsedge (*Cyperus esculentus*), pasture spike sedge (*Kyllinga gracillima*), green kyllinga (*Kyllinga brevifolia*), grasslike fimbristylis (*Fimbristylis miliacea*), annual fringerush (*Fimbristylis dichotoma*), slender spikerush (*Eleocharis acicularis*), *Eleocharis kuroguwai*, Japanese bulrush (*Schoenoplectiella hotarui*), hardstem bulrush (*Schoenoplectiella juncoides*), *Schoenoplectiella wallichii*, rough-seed bulrush (*Schoenoplectiella mucronatus*), *Schoenoplectiella triangulatus, Schoenoplectiella nipponicus*, triangular club-rush (*Schoenoplectiella triqueter*), *Bolboschoenus koshevnikovii*, river bulrush (*Bolboschoenus fluviatilis*)

Equisetaceae weeds: field horsetail (*Equisetum arvense*), marsh horsetail (*Equisetum palustre*)

Salviniaceae weeds: floating fern (*Salvinia natans*)

Azollaceae weeds: Japanese mosquitofern (*Azolla japonica*), feathered mosquito fern (*Azolla pinnata*)

Marsileaceae weeds: clover fern (*Marsilea quadrifolia*)

Other: Filamentous algae (*Pithophora, Cladophora*), *Bryophyta, Marchantiophyta, Anthocerotophyta, Cyanobacteria, Pteridophyta*, sucker of perennial crop (pome fruits, stone fruits, berry fruits, nuts, citrus fruits, hops, grapes, etc.)

In the above weeds, mutations within the species are not particularly limited. Namely, the weeds also include any weeds that have reduced sensitivity (also referred to "have resistance") to a specific herbicide. The reduced sensitivity may be attributed to a mutation at a target site (target site mutation), or may be attributed to any factors other than target site mutation (non-target site mutation). Target site mutation include those in which the substitution of amino acid residue of a protein as a target site occurred due to mutation of an open reading frame corresponding to amino acid sequence of the protein, and those in which the protein as the target site is overexpressed due to mutation such as deletion of the suppressor sequence in the promoter region, amplification of the enhancer sequence, or increase in the number of copies of genes. Examples of non-target site mutation include metabolic enhancement, defective absorption, defective transition, efflux out of the system and the like. Examples of the factor of the metabolic enhancement include enhanced activity of metabolic enzymes such as cytochrome P450 monooxygenases, aryl acylamidases, esterases and glutathione S-transferase. The efflux out of the system includes the transportation to a vacuole by an ABC transporter.

Examples of the substitution of an amino acid residue at a target site include the followings.

ALS: A122T, A122V, A122Y, P197S, P197H, P197T, P197R, P197L, P197Q, P197A, P197I, A205V, A205F, D376E, R377H, W574L, W574G, W574M, S653T, S653N, S653I, G654E or G654D;

ACCase: I1781L, I1781V, I1781T, W1999C, W1999L, A2004V, W2027C, I2041N, I2041V, D2078G or C2088R, G2096R;

PPX2: G210Δ, R98L, R98M, R98G, R98H, G399A;

EPSP: T102I, P106S, P106A or P106L.

Weeds that can be controlled by the present composition and the present method may have multiple substitutions of amino acid residues mentioned above. In this case, multiple substitutions of amino acid residues may be for either the same protein or different proteins. Weeds may have multiple non-target site mutations and target site mutations.

Examples of weeds having a target site mutation include the followings.

palmer amaranth (*Amaranthus palmeri*) having the substitution of an amino acid residue of G210Δ, R98M, R98G or G399A in PPX2;

waterhemp (*Amaranthus tuberculatus*=*Amaranthus rudis*=*Amaranthus tamariscinus*) having the substitution of an amino acid residue of G210Δ, R98M, R98G or G399A in PPX2;

common ragweed (*Ambrosia artemisiifolia*) having the substitution of an amino acid residue of R98L in PPX2;

bomugi (rigid ryegrass; *Lolium rigidum*) having the substitution of an amino acid residue of R98H in PPX2;

goosegrass (*Eleusine indica*) having the substitution of an amino acid residue of T102I, P106S, P106A or P106L in EPSP;

bomugi (rigid ryegrass; *Lolium rigidum*) having the substitution of an amino acid residue of T102I, P106S, P106A or P106L in EPSP;

sourgrass (*Digitaria insularis*) having the substitution of an amino acid residue of T102I, P106S, P106A or P106L in EPSP;

waterhemp (*Amaranthus tuberculatus*=*Amaranthus rudis*=*Amaranthus tamariscinus*) having the substitution of an amino acid residue of T102I, P106S, P106A or P106L in EPSP;

jungle rice (*Echinochloa colona*) having the substitution of an amino acid residue of T102I, P106S, P106A or P106L in EPSP.

Palmer amaranth (*Amaranthus palmeri*), waterhemp (*Amaranthus tuberculatus*=*Amaranthus rudis*=*Amaranthus tamariscinus*) and common ragweed (*Ambrosia artemisiifolia*) each having the target site mutation in PPX2 have resistance to PPO inhibitors such as lactofen, fomesafen and flumioxazin.

Examples of weeds having multiple substitutions of amino acid residues mentioned above include glyphosate-resistant goosegrass (*Eleusine indica*), Italian ryegrass (*Lolium multiflorum*), bomugi (rigid ryegrass; *Lolium rigidum*), sourgrass (*Digitaria insularis*), waterhemp (*Amaranthus tuberculatus*=*Amaranthus rudis*=*Amaranthus tamariscinus*) and jungle rice (*Echinochloa colona*) each having the substitution of amino acid residues of T102I and P106S.

Examples of other weeds include the followings.

palmer amaranth (*Amaranthus palmeri*), waterhemp (*Amaranthus tuberculatus*=*Amaranthus rudis*=*Amaranthus tamariscinus*) and kochia (*Kochia scoparia*) in which sensitivity to glyphosate is reduced due to overexpression of an EPSP gene;

jungle rice (*Echinochloa colona*) in which sensitivity to glyphosate is reduced due to increased expression of an aldo-keto reductase;

marestail (*Conyza canadensis*), Sumatran fleabane (*Conyza sumatrensis*) and fleabane (*Conyza bonariensis*) having resistance in which sensitivity to glyphosate involved in an ABC transporter is reduced.

The present composition exerts particularly high effect on the above-mentioned palmer amaranth (*Amaranthus palmeri*), waterhemp (*Amaranthus tuberculatus*=*Amaranthus rudis*=*Amaranthus tamariscinus*), kochia (*Kochia scoparia*), marestail (*Conyza canadensis*), Sumatran fleabane (*Conyza sumatrensis*) and fleabane (*Conyza bonariensis*).

In the cultivation of a crop in the present invention, a plant-nutritional management in a common crop cultivation can be made. A fertilization system may be one based on Precision Agriculture, or may be a conventional homogeneous one. Alternatively, a nitrogen-fixing bacterium or a mycorrhizal fungus may be inoculated together with a seed treatment.

EXAMPLES

Hereinbelow, the present invention will be described in more detail by way of Examples. However, the present invention is not limited by these Examples.

At first, criteria for the evaluation of the herbicidal effect and the harmful effect on crops shown in the below-mentioned examples will be described.

[Herbicidal Effect and Harmful Effect on Crops]

The herbicidal effect was rated within a range of 0 to 100, wherein "0" was a rating where the state of emergence or growth of a sample weed during a test had no difference or little difference compared with the state of the test weed that did not subjected to the treatment, and "100" was a rating where the test plant was completely killed or the emergence or growth of the test weed was completely suppressed.

The harmful effect on crops was rated as "harmless" when little harmful effect was observed, "low" when a moderate level of harmful effect was observed, "medium" when a medium level of harmful effect was observed, and "high" when a high level of harmful effect was observed.

Example 1

The weeds (palmer amaranth (*Amaranthus palmeri*), waterhemp (*Amaranthus tuberculatus*=*Amaranthus* rudis=*Amaranthus tamariscinus*), common ragweed (*Ambrosia artemisiifolia*), giant ragweed (*Ambrosia trifida*), marestail (*Conyza canadensis*), common lambsquarters (*Chenopodium album*), kochia (*Kochia scoparia*), common barnyardgrass (*Echinochloa crus-galli*) and giant foxtail (*Setaria faberi*)) and soybeans (CZ3929GTLL: LibertyLink GT27) are seeded in a plastic pot. The weeds are then cultivated in a greenhouse, and at 21 days after the seeding, a spray liquid prepared by diluting a flumioxazin formulation (Valor SX: manufactured by Valent USA) and a glufosinate-ammonium formulation (Liberty 280SL: manufactured by BASF) with water is applied to the foliage at a spray volume of 200 L/ha so that the application rate of the flumioxazin might be 1 or 2 g/ha and the application rate of glufosinate-ammonium might be 590 g/ha. The weeds are further cultivated in a greenhouse, and at 7 days and 14 days after the application, the effect on the weeds is investigated. A synergistic weed control effect compared to the single use of each of the compounds is confirmed.

Example 2

The application is performed in the same manner, except that the glufosinate-ammonium formulation in Example 1 is replaced by a glufosinate-P-sodium formulation (Zaxa soluble liquid: manufactured by Meiji Seika Pharma Co., Ltd.) and the application rate of glufosinate-P-sodium is replaced by 280 g/ha.

Examples 3 to 4

The application is performed in the same manner, except that the flumioxazin formulation in Examples 1 to 2 is replaced by an emulsifiable concentrate of the compound X (containing 55 g/L of the compound X).

Examples 5 to 6

The application is performed in the same manner, except that the flumioxazin formulation in Examples 1 to 2 is replaced by a trifludimoxazin formulation (suspension concentrate containing 500 g/L of triaudimoxazin).

Examples 7 to 8

The application is performed in the same manner, except that the flumioxazin formulation in Examples 1 to 2 is replaced by a formulation of the compound Z (suspension concentrate containing 500 g/L of the compound Z).

Example 9

A plastic pot was filled with soil, then waterhemp (*Amaranthus tuberculatus=Amaranthus rudis=Amaranthus tamariscinus*) having the substitution of an amino acid residue of G210Δ in PPX2 was seeded, followed by cultivation in a greenhouse for 41 days. Each of a spray liquid obtained by diluting an emulsifiable concentrate of a predetermined amount of the compound X with water containing a spreading agent, a spray liquid obtained by diluting a predetermined amount of glufosinate-ammonium formulation with water containing a spreading agent, and a spray liquid obtained by diluting a predetermined amount of an emulsifiable concentrate of the compound X and a predetermined amount of glufosinate-ammonium formulation with water containing a spreading agent was uniformly sprayed from above the pot using a spraying machine so that the spray volume might be 216 L/ha. After cultivation in a greenhouse for 28 days, herbicidal effect was investigated. The results are shown in Table 1.

TABLE 1

| Application rate of g lufosinate-ammonium | Application rate of compound X | Herbicidal effect |
| --- | --- | --- |
| — | 0.5 g/ha | 17 |
| — | 1 g/ha | 18 |
| 350 g/ha | — | 37 |
| 350 g/ha | 0.5 g/ha | 70 |
| 350 g/ha | 1 g/ha | 71 |

Example 10

A plastic pot was filled with soil, waterhemp (*Amaranthus tuberculatus=Amaranthus rudis=Amaranthus tamariscinus*) having the substitution of an amino acid residue of G210Δ in PPX2 was seeded, followed by cultivation in a greenhouse for 41 days. Each of a spray liquid obtained by diluting a predetermined amount of an emulsifiable concentrate of trifludimoxazin (emulsifiable concentrate containing 50 g/L of trifludimoxazin) with water containing a spreading agent, a spray liquid obtained by diluting a predetermined amount of a glufosinate-ammonium formulation with water containing a spreading agent, and a spray liquid obtained by diluting a predetermined amount of an emulsifiable concentrate of trifludimoxazin and a predetermined amount of a glufosinate-ammonium formulation with water containing a spreading agent was uniformly sprayed from above the pot using a spraying machine so that the spray liquid amount might be 216 L/ha. After cultivation in a greenhouse for 28 days, herbicidal effect was investigated.

The results are shown in Table 2.

TABLE 2

| Application rate of g lufosinate-ammonium | Application rate of trifludimoxazin | Herbicidal effect |
| --- | --- | --- |
| — | 0.5 g/ha | 10 |
| 350 g/ha | — | 37 |
| 350 g/ha | 0.5 g/ha | 68 |

INDUSTRIAL APPLICABILITY

The present composition and the present method can be used for controlling weeds effectively.

The invention claimed is:

1. A herbicidal composition, comprising:
a PPO-inhibiting herbicide represented by the following formula (I):

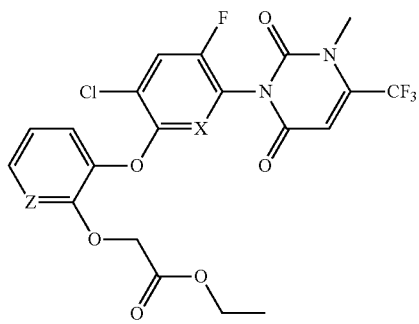

(I)

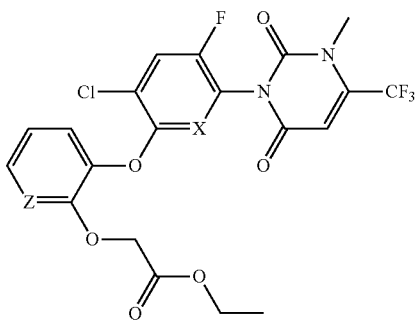

(I)

wherein X represents a nitrogen atom, and Z represents CH; and glufosinate-ammonium or glufosinate-P-ammonium, wherein a weight ratio of the PPO-inhibiting herbicide to the glufosinate-ammonium or glufosinate-P-ammonium is 1:350 to 1:700.

2. A method for controlling weeds, comprising:

simultaneously or sequentially in any order applying a PPO-inhibiting herbicide represented by the following formula (I):

wherein X represents a nitrogen atom, and Z represents CH, and glufosinate-ammonium or glufosinate-P-ammonium, wherein a weight ratio of the PPO-inhibiting herbicide to the glufosinate-ammonium or glufosinate-P-ammonium is 1:350 to 1:700.

3. The method for controlling weeds according to claim 2, wherein the weeds to be controlled are waterhemp having a substitution of an amino acid residue of G210Δ in PPX2.

* * * * *